United States Patent
Xin et al.

(10) Patent No.: US 12,432,778 B2
(45) Date of Patent: Sep. 30, 2025

(54) PREEMPTION / INTERRUPTION OF AN ONGOING LOW PRIORITY PPDU

(71) Applicants: SONY GROUP CORPORATION, Tokyo (JP); SONY CORPORATION OF AMERICA, New York, NY (US)

(72) Inventors: Liangxiao Xin, Santa Clara, CA (US); Mohamed Abouelseoud, Burlingame, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, Tokyo (JP)

( * ) Notice: Subject to any disclaimer, the term of this patent is extended or adjusted under 35 U.S.C. 154(b) by 519 days.

(21) Appl. No.: 17/820,454

(22) Filed: Aug. 17, 2022

(65) Prior Publication Data
US 2023/0081745 A1    Mar. 16, 2023

Related U.S. Application Data

(60) Provisional application No. 63/261,213, filed on Sep. 15, 2021.

(51) Int. Cl.
*H04W 74/0816* (2024.01)
*H04W 84/12* (2009.01)

(52) U.S. Cl.
CPC ........ *H04W 74/0816* (2013.01); *H04W 84/12* (2013.01)

(58) Field of Classification Search
CPC . H04W 74/0816; H04W 84/12; H04W 72/56; H04L 5/0044; H04L 5/14
(Continued)

(56) References Cited

U.S. PATENT DOCUMENTS

| 2007/0206533 A1 | 9/2007 | Wiatrowski |
| 2008/0291853 A1 | 11/2008 | Wiatrowski |

(Continued)

FOREIGN PATENT DOCUMENTS

| JP | 2016527845 A | 9/2016 |
| JP | 2017212476 A | 11/2017 |
| JP | 2017538330 A | 12/2017 |

OTHER PUBLICATIONS

Adame, Toni et al., "Time-Sensitive Networking in IEEE 802.11be: On the Way to Low-Latency WiFi 7", Sensors 2021, 21, 4954, pp. 1-20, https://doi.org/10.3390/s21154954 2021, published Jul. 21, 2021.

*Primary Examiner* — Mang Hang Yeung
(74) *Attorney, Agent, or Firm* — O'BANION & RITCHEY LLP; John P. O'Banion

(57) ABSTRACT

A wireless local area network (WLAN) having stations (STAs) using Carrier Sense Multiple Access/Collision Avoidance (CSMA/CA) in which at least some stations support Full Duplex (FD) transmission. Mechanisms are described in which a STA can send a preemption request to a station performing ongoing transmissions. The preempted STA detects a preemption request of this preempting STA. The preempted STA interrupts its ongoing transmission; if it has determined to accept the preemption request. Thus, the preempting STA preempts the transmission of the preempted STA, to send a preemptive transmission, after receiving notification that the preempted STA has interrupted its ongoing transmission.

20 Claims, 29 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2015/0172038 A1* | 6/2015 | Jiang | H04L 5/143 |
| | | | 370/280 |
| 2016/0119805 A1* | 4/2016 | Aldana | H04W 76/22 |
| | | | 370/252 |
| 2017/0366956 A1* | 12/2017 | Yoshida | H04W 8/005 |
| 2020/0014576 A1 | 1/2020 | Cherian | |
| 2020/0288439 A1 | 9/2020 | Seok | |
| 2020/0367263 A1 | 11/2020 | Cavalcanti | |
| 2021/0289552 A1 | 9/2021 | Aboul-Magd | |

* cited by examiner

PREEMPTION / INTERRUPTION OF AN ONGOING LOW PRIORITY PPDU

CROSS-REFERENCE TO RELATED APPLICATIONS

This application claims priority to, and the benefit of, U.S. provisional patent application Ser. No. 63/261,213 filed on Sep. 15, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communications, and more particularly to a protocol allowing preemption and/or interruption of ongoing lower priority data.

2. Background Discussion

Stations on the network transmit and receive Physical Layer Protocol Data Units (PPDUs) in a Wireless Local Area Network (WLAN). Some of these stations are configured for performing Full Duplex communications in which they simultaneously transmit and receive.

However, high priority traffic is often hindered by these ongoing communications.

Accordingly, the present disclosure overcomes this issue, and provides additional benefits.

BRIEF SUMMARY

During ongoing communications between stations (STAs), there are instances when higher priority traffic is being held up by these ongoing transmissions. For example, assume that a STA, denoted as STA A has Full Duplex (FD) capability and is transmitting a PPDU; while another STA, denoted as STA B, has higher priority traffic to be sent. The present disclosure describes mechanisms which allow STA B to request to interrupt and, in some cases, preempt the transmission of STA A.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Station Hardware and Network Topology

The present disclosure describes an apparatus and method for wireless network communication between stations executing a Carrier Sense Multiple Access/Collision Avoidance protocol under 802.11.

1.1. FD Stations with Self-Interference Cancelation (SIC)

Station hardware for stations which provide Full Duplex (FD) operation typically have a Radio Frequency Front End (RFFE) 30 which provides for Self-Interference Cancelation (SIC) as has been described in previous FD STA applications by Sony.

Figure 1:
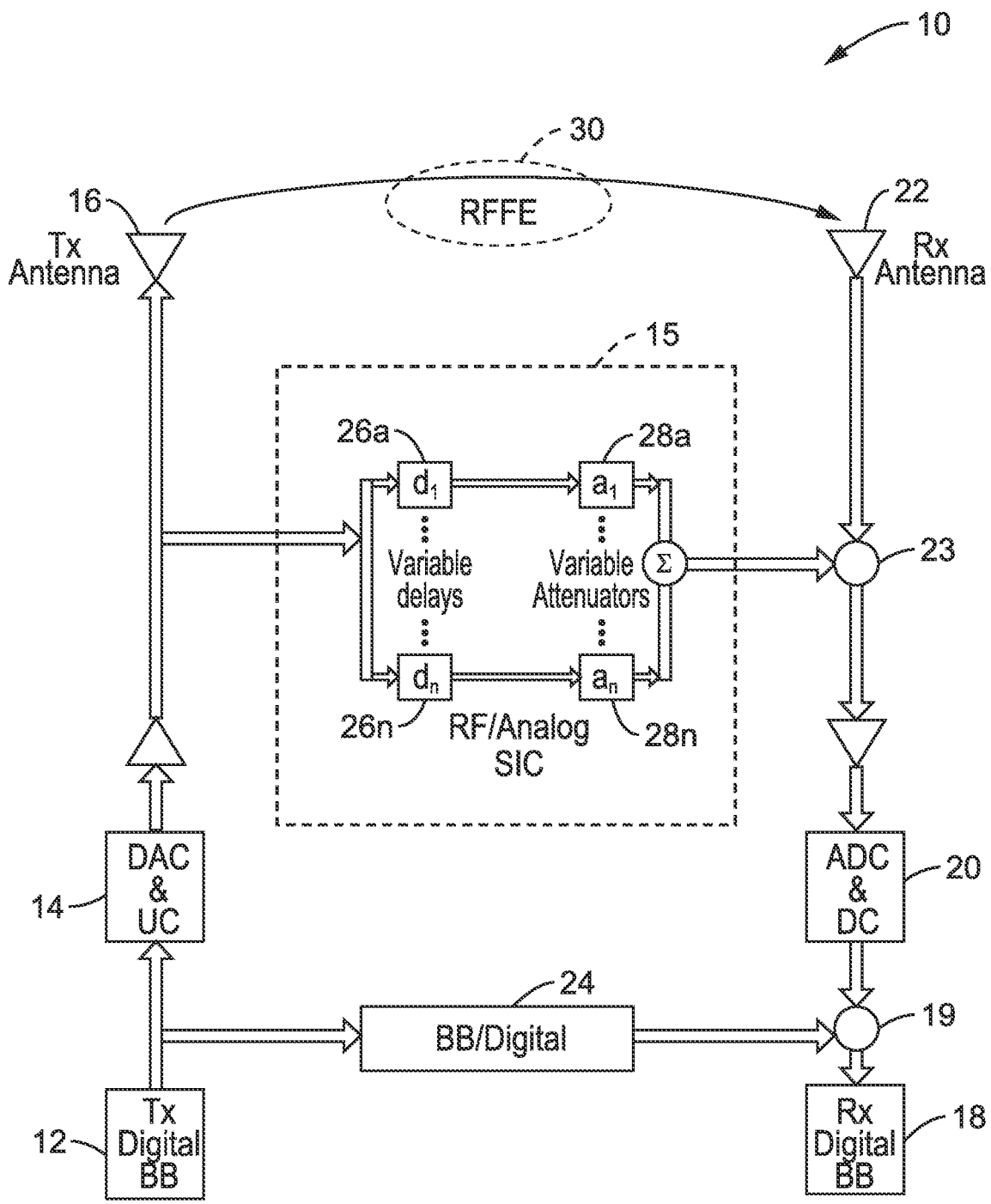
FIG. 1 is a block diagram of self-interference cancelation (SIC) hardware on a wireless station, according to at least one embodiment of the present disclosure.

FIG. 1 illustrates an example embodiment 10 of Self-Interference Cancelation (SIC) hardware as utilized in a station having a Radio Frequency Front End (RFFE) 30. This SIC hardware is utilized in wireless local area networks (WLANs), such as the STA seen below in FIG. 2 and the MLD seen in FIG. 3.

The Tx Digital BB 12 is the baseband Transmit (TX) signal. The baseband digital signal accumulates harmonics and transmitter noises through modulation of the Digital-to-Analog converter (DAC) and upconverter (UC) 14 to a passband signal. Before the transmitted signal goes to TX antenna 16, a small portion of the transmitted signal, which includes the transmitter noise, is passed through circuit 15 to do Analog SIC.

The SIC circuit consists of parallel fixed lines of varying delays 26a through 26n and tunable attenuators 28a through 28n. These lines are then collected and added up, and this combined signal is then subtracted 23 from the signal on the receive path.

The passband signal received from antenna 22, has SIC correction applied 23, and passes through analog to digital converter (ADC) and down converter (DC) 20. A digital SIC 24 is applied 19 to the baseband digital signal from the ADC and DC, to estimate the remaining residual self-interference, which includes the main TX SI after analog cancellation and any delayed reflections of this signal from the environment, to produce receiver digital baseband signal 18.

Figure 2:
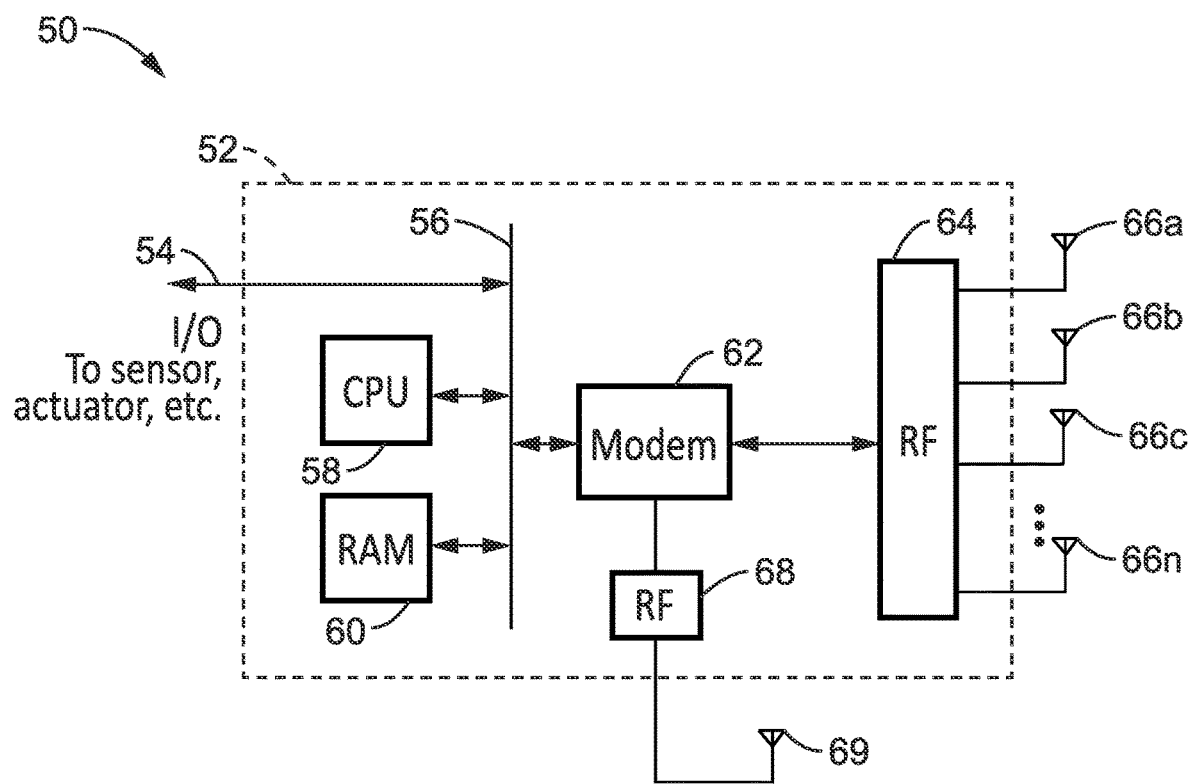
FIG. 2 is a hardware block diagram of wireless station (STA) hardware, according to at least one embodiment of the present disclosure.

FIG. 2 illustrates an example embodiment 50 of STA hardware configured for executing the protocol of the present disclosure. An external I/O connection 54 preferably couples to an internal bus 56 of circuitry 52 upon which are connected a CPU 58 and memory (e.g., RAM) 60 for executing a program(s) which implement the communication protocol. The host machine accommodates at least one modem 62 to support communications coupled to at least one RF module 64, 68 each connected to one or multiple antennas 69, 66a, 66b, 66c through 66n. An RF module with multiple antennas (e.g., antenna array) allows for performing beamforming during transmission and reception. In this way, the STA can transmit signals using multiple sets of beam patterns.

Bus 54 allows connecting various devices to the CPU, such as to sensors, actuators and so forth. Instructions from memory 60 are executed on processor 58 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 62, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 3:
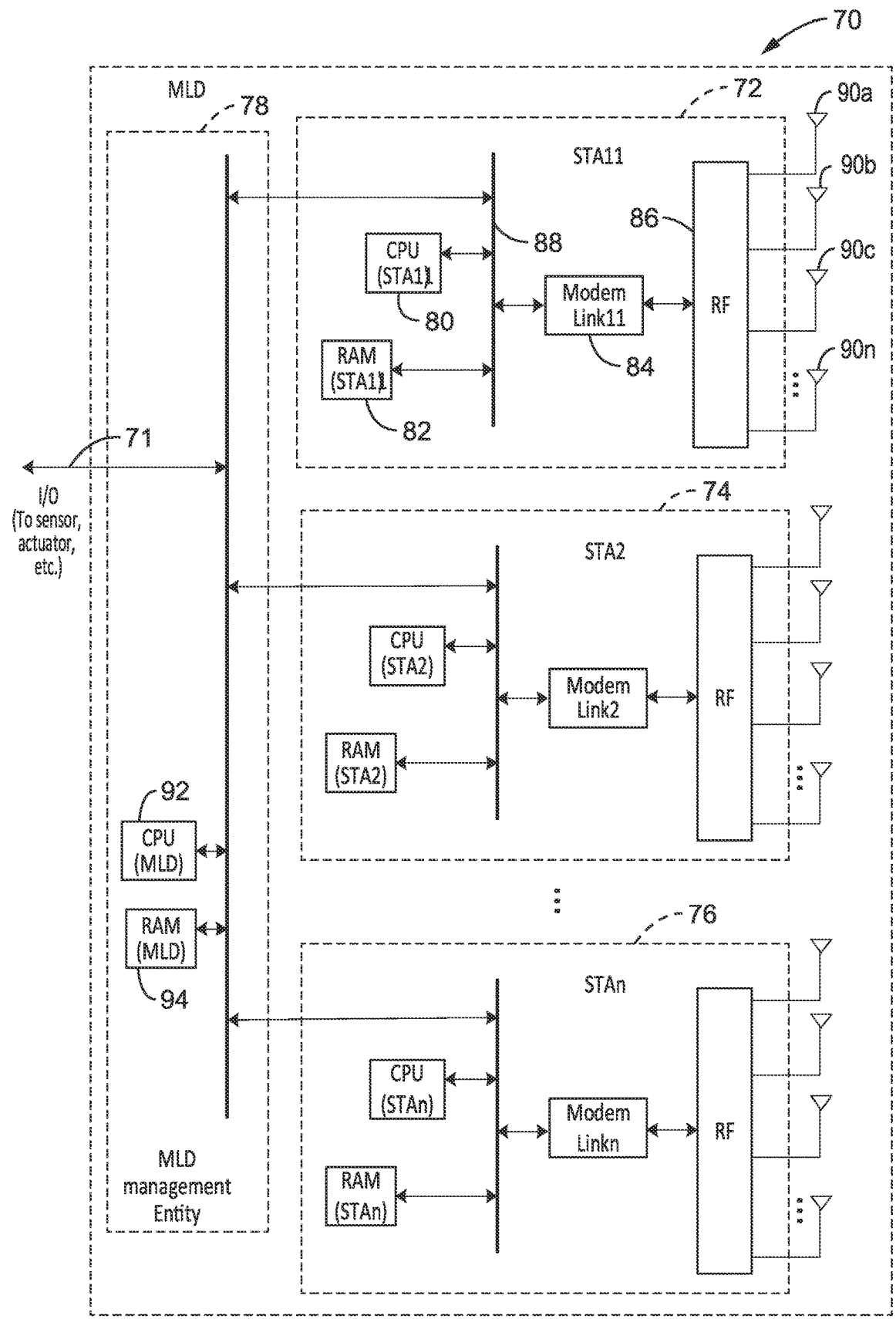
FIG. 3 is a hardware block diagram of a station configuration, such as contained in Multi-Link Device (MLD) hardware, according to at least one embodiment of the present disclosure.

FIG. 3 illustrates an example embodiment 70 of a multi-link device (MLD) hardware configuration. The MLDs may comprise a soft AP MLD, which is a MLD that consists of one or more affiliated STAs, which are operated as APs. A soft AP MLD should support multiple radio operations on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 78 having a CPU 92 and memory (e.g., RAM) 94 to allow executing a program(s) that implement communication protocols at the MLD level. The MLD can distribute tasks to, and collect information from, each affiliated station to which it is connected, exemplified here as STA1 72, STA2 74 through to STA_N 76 and the sharing of information between affiliated STAs.

In at least one embodiment, each STA of the MLD has its own CPU 80 and memory (RAM) 82, which are coupled through a bus 88 to at least one modem 84 which is connected to at least one RF circuit 86 which has one or more antennas. In the present example the RF circuit has multiple antennas 90a, 90b, 90c through 90n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

1.2. Example Network Topology

Figure 4:
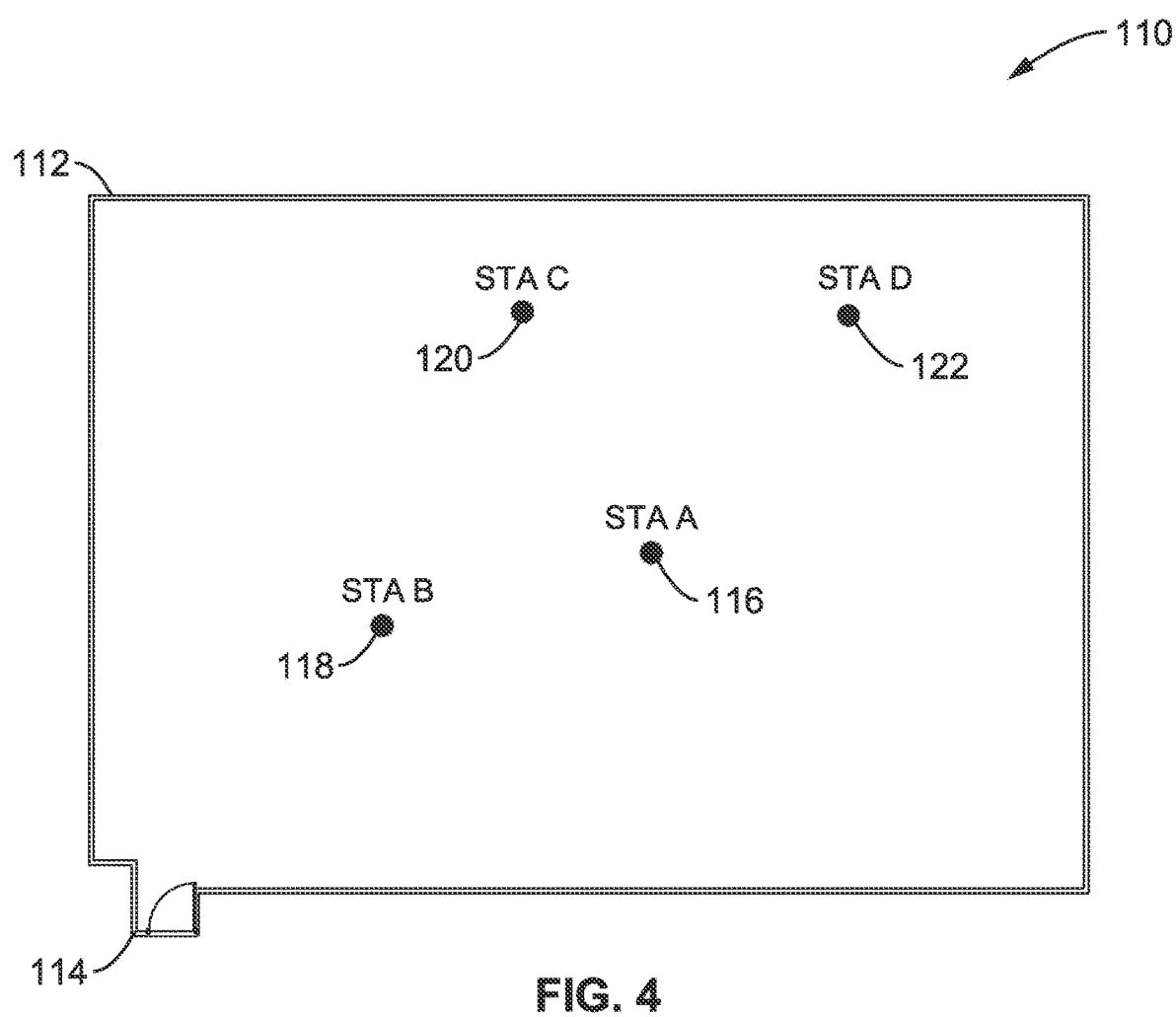
FIG. 4 is an example network topology used for demonstration purposes according to at least one embodiment of the present disclosure.

FIG. 4 illustrates an example embodiment 110 of a network topology used in the examples, by way of illustration and not by way of limitation, which is also true of the other topologies exemplified herein. In this example stations are shown in a communication area 112, such as a room or building, which may have apertures (doors/windows) 114, within this area may be a plurality of stations (STAs) exemplified as 116, 118, 120, and 122. Of these STAs, STA A 116 and STA C 120 are capable of full duplex (FD) transmissions. All of these STAs are using CSMA/CA to contend for channel access.

2.0. Full Duplex Station Using CSMA/CA

Consider a Full Duplex (FD) STA using CSMA/CA to contend for the channel. A FD STA is capable of transmitting and receiving a Physical Layer Protocol Data Unit (PPDU) over the same channel at the same time.

2.1. Problem Statement

Situations arise in which a STA, denoted here by STA A, is transmitting a PPDU, when another STA, denoted by STA B, having a higher priority request would benefit from interrupting the ongoing transmission and preempting the transmission of STA A. This situation can prove especially beneficial when STA B has a significantly higher priority PPDU to transmit than the ongoing PPDU of STA A. It is assumed that STA A is capable of FD transmission, while STA B may also be capable of FD transmission.

This approach describes a method that allows STA B to request preempting the ongoing transmission of STA A.

2.2. Terms Utilized

FD originator STA: a STA that starts a PPDU transmission and allows the full duplex transmission during the PPDU transmission.

FD recipient STA: a STA that is allowed to transmit a PPDU to the FD originator STA during a PPDU transmission of the FD originator for full duplex transmission.

Preempting STA: a STA that sends a preemption request for preempting the ongoing transmission of the preempted STA. The PPDU transmission of the preempting STA which is requested to preempt the ongoing transmission of the preempted STA is denoted as a preemption transmission.

Preempted STA: a STA that receives a preemption request and arranges the preemption transmission of the preempting STA.

It should be noted that in at least one embodiment, a FD recipient STA or preempted STA cannot be a preempting STA.

3. Third Party Transmission Detection

This section considers a scenario of a STA sending a PPDU to another STA. The STA which sends the PPDU is denoted as the transmitter STA and the STA which is the intended receiver of the PPDU is denoted as the receiver STA. The other STAs are the STAs that are not transmitter STA nor receiver STA, and thus are considered a "third party".

A mechanism is described to detect a third party transmission, such as a STA detecting another PPDU transmission during the time that the transmitter STA is transmitting the PPDU on the same channel. Third party transmission detection can aid the receiver STA and other STAs to recognize whether there are two PPDUs transmitting at the same time. If the transmitter STA is FD capable, then the receiver STA or the other STA can send a PPDU to the transmitter STA when there is no third party transmission detected. When a third party transmission is detected, the receiver STA or the other STA should not send a PPDU to the transmitter STA for the following reasons. The PPDU sent by the receiver STA, or the other STA interferes with the third party transmission. The transmitter STA is not able to receive the PPDU sent by the receiver STA, or the other STA, if it hears (receives) the third party transmission.

A practical use case of this third party transmission detection is to launch preemption transmissions which will be introduced later.

When the transmitter STA is FD capable, it can detect third party transmission since it is able to receive while it is transmitting. However, for the receiver STA and the other STAs, they are not able to receive two PPDUs at the same time even if they are FD capable. Therefore, this section proposes a solution to let the receiver STA and the other STAs detect third party transmission detection.

This section proposes that the transmitter STA leaves (reserves) some punctured resources of the channel empty when it transmits a PPDU. It should be appreciated that 'puncturing' is an optional feature introduced in 802.11ax for improving spectral efficiency by allowing transmission of a "punctured" portion of the spectrum channel if some of the channel is being used by legacy users. In the present disclosure a punctured resource is used for different purposes.

Since the PPDU is not transmitted over the punctured resource, the receiver STA and the other STAs sense that the channel is idle during the punctured resource when the transmitter STA is the only STA transmitting PPDU. When there is a third party transmission over the punctured resource, the receiver STA and the other STA senses the channel is busy during the punctured resource and detects a third party transmission.

This section also proposes that when the transmitter STA is transmitting a PPDU and detects a third party transmission, it could send information through the punctured resource to indicate its third party transmission detection. Then, the receiver STA and the other STA can recognize that the transmitter STA is not able to receive the PPDU from them due to this third party transmission.

An approach is detailed in which the receiver STA and the other STAs detecting third party transmission; such as a transmission which is launched by a STA other than the transmitter STA during the time that the transmitter STA is transmitting the PPDU to a receiver.

4. Embodiments of Third Party Detection

4.1. Third Party Transmission Detection

Figure 5:
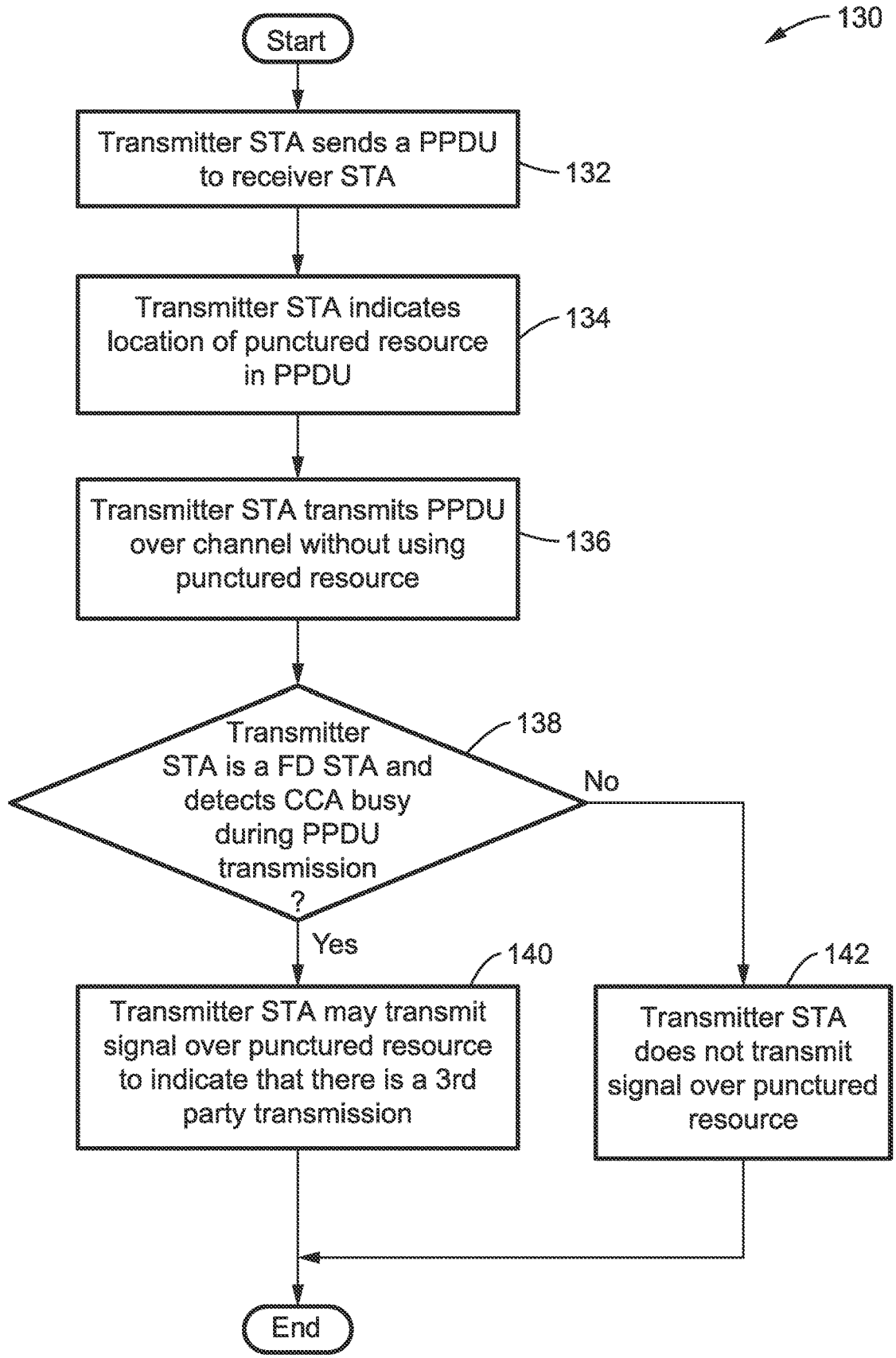
FIG. 5 is a flow diagram of a transmitter STA sending a PPDU with punctured resource for aiding the receiver and other STAs in detecting a third party transmission according to at least one embodiment of the present disclosure.

FIG. 5 illustrates an example embodiment 130 of a transmitter STA sending a PPDU with a punctured resource that can aid the receiver STA as well as other STAs to detect a third party transmission during the PPDU transmission time.

Figure 29:
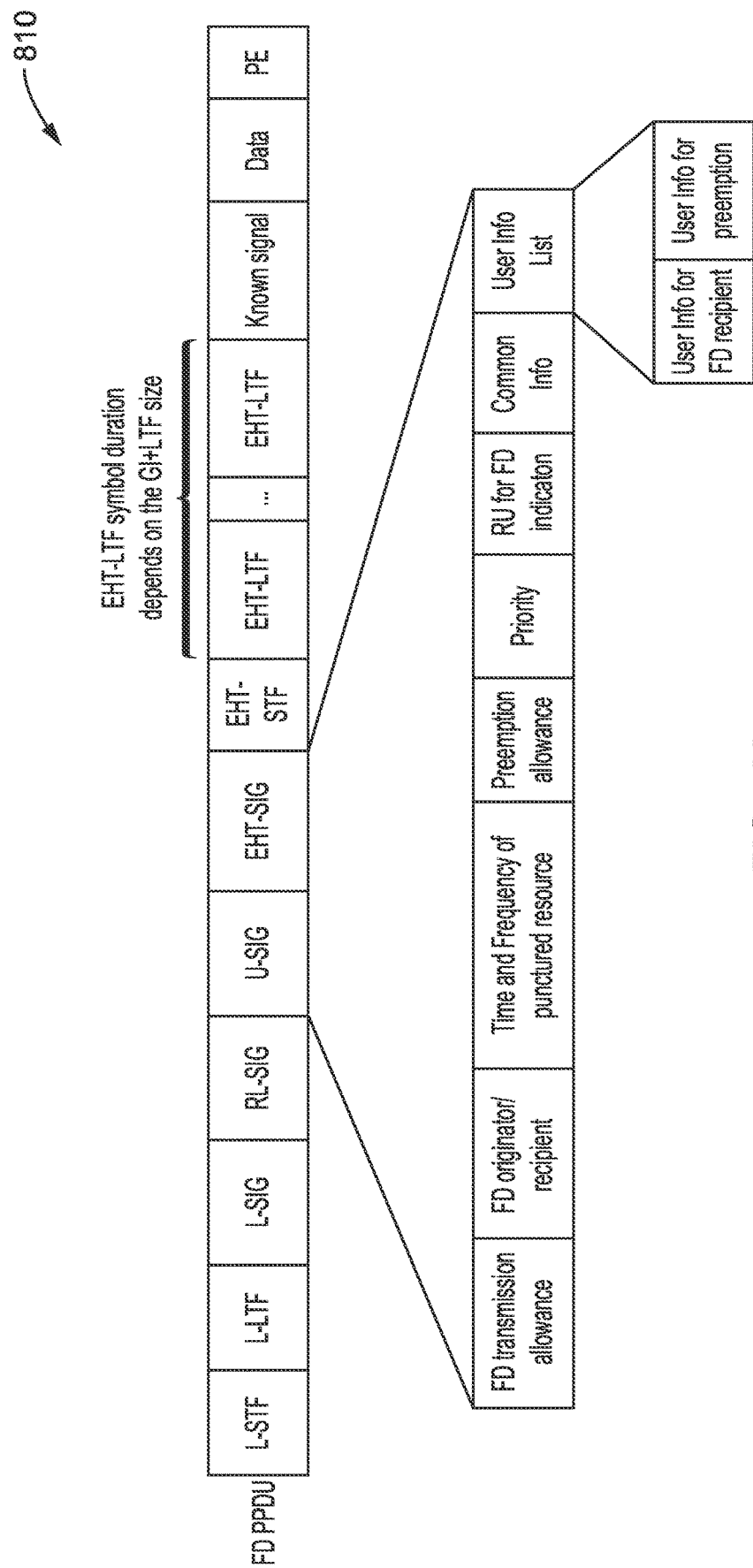
FIG. 29 is a data field diagram of a FD PPDU format that can be used for the FD transmission and preemption according to at least one embodiment of the present disclosure.

The transmitter STA sends 132 a PPDU to the receiver STA. The Transmitter STA specifies 134 and indicates the location of the punctured resource in its PPDU. For example, the location of the punctured resource is signaled in the preamble of the PPDU as shown in FIG. 29. The PPDU is transmitted 136 over the channel without using the punctured resource.

A check 138, determines if the transmitter STA is capable of full duplex transmission and is detecting CCA busy during the PPDU transmission. If the condition is met, then that STA may transmit 140 a signal (not part of the PPDU transmission) over the punctured resource to indicate that there is a third party transmission. Otherwise, at block 142 the transmitter STA does not transmit this signal over the punctured resource.

The punctured resource can be any type of channel resource that is capable of carrying the signal during the PPDU. For example, the punctured resource can be in terms of RUs, OFDM symbols, and/or tones of carrier. For example, if a punctured resource is in terms of RU, then the transmitter does not transmit signal over that RU for a certain period of time. If a punctured resource is in terms of OFDM symbols, then the transmitter does not transmit a signal for several OFDM symbol durations. If the punctured resource is in terms of a tone of a carrier, then the transmitter does not transmit signal over that tone for a certain period of time. The punctured resources can be embedded during PPDU transmission periodically. It should be noted that it is possible that the punctured resource signal is carried by the preamble of PPDU. The location of the punctured resource can be randomly decided by the transmitter per each PPDU.

In at least one embodiment/mode/option, the punctured resources over different channel frequencies have to be located at the same periods of channel time. In at least one embodiment/mode/option the punctured resources on the different frequencies should start and/or end at the same.

Figure 6:
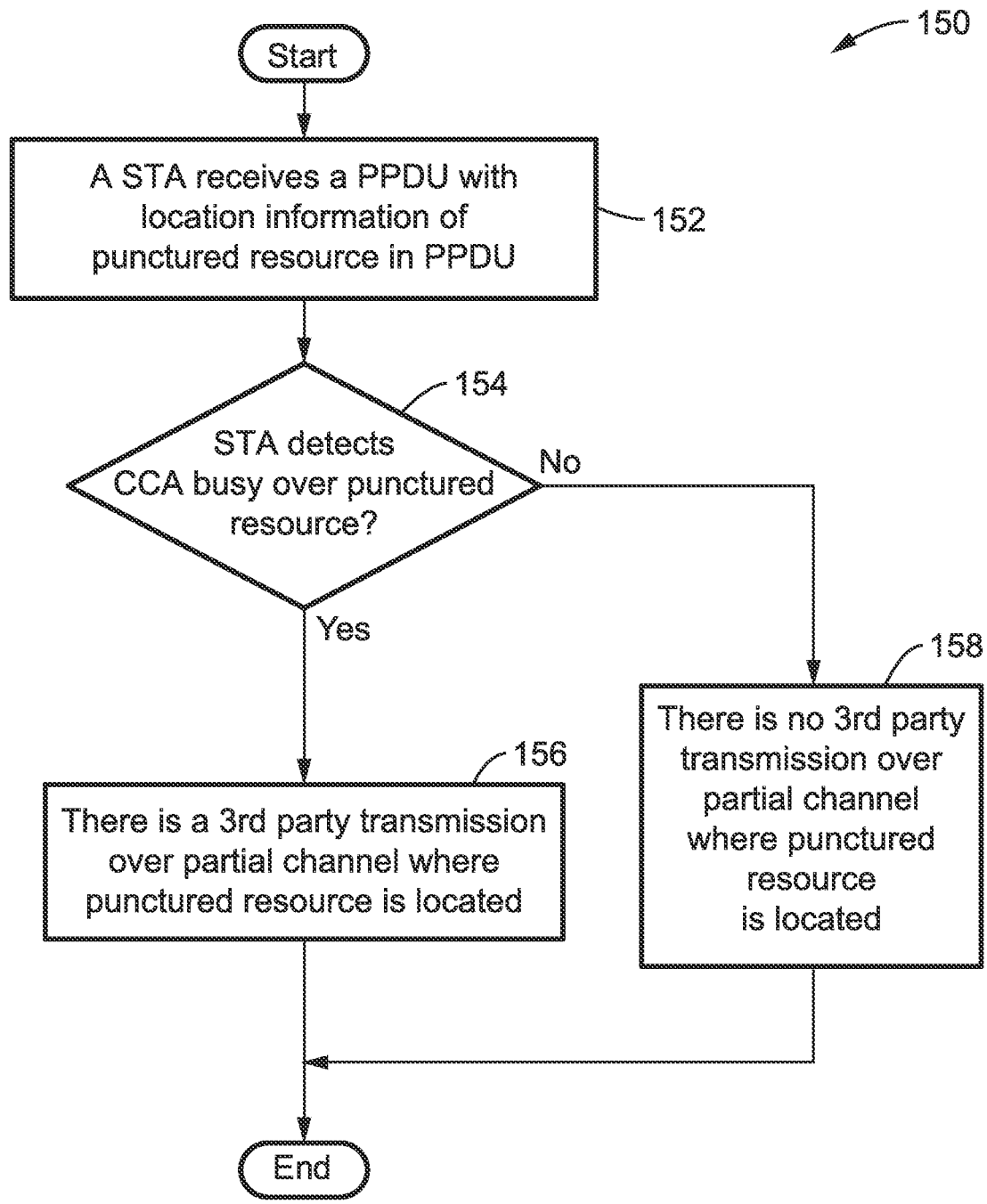
FIG. 6 is a flow diagram of a STA detecting third party transmission when it is receiving a PPDU according to at least one embodiment of the present disclosure.

FIG. 6 illustrates an example embodiment 150 of a STA detecting third party transmissions when it is receiving 152 a PPDU with the location information of the punctured resource in the receiving PPDU. It will be noted that the STA may or may not be the intended receiver of the PPDU.

Then, a check 154 determines the result of STA channel sensing over the punctured resource. If the STA senses CCA busy over the punctured resource, then at block 156 a third party transmission is registered. This third party detection indicates that a STA other than the transmitter STA of the PPDU is transmitting at the same time. If the punctured resource is located over a partial channel, such as an RU, then the STA recognizes there is a third party transmission over that partial channel. Otherwise, if there is no third party transmission then block 158 is reached, and the process ends.

4.2.1. Example 1 of Third Party Detection

Figure 7:
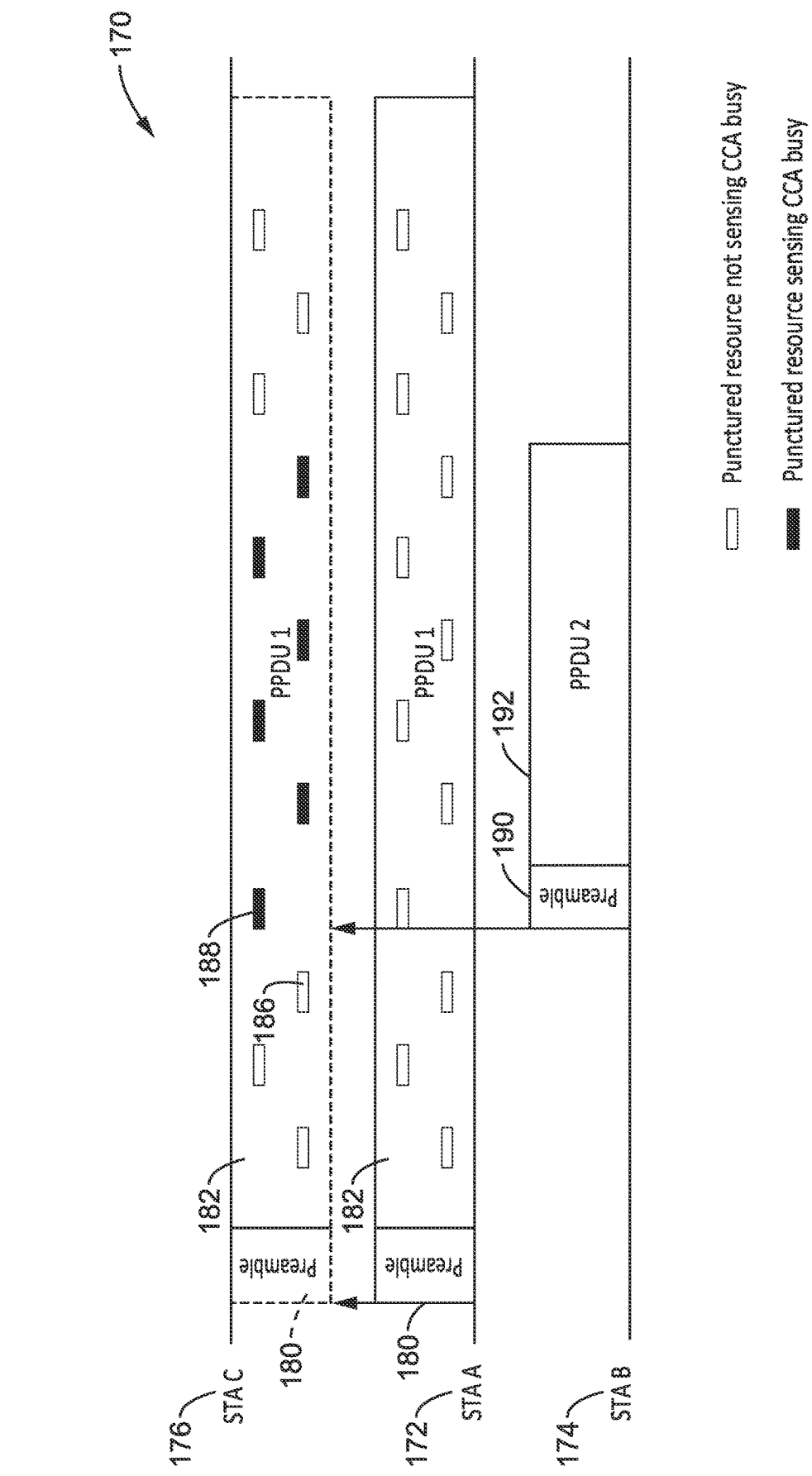
FIG. 7 is a communication diagram of detecting a third party transmission based on channel conditions according to at least one embodiment of the present disclosure.

FIG. 7 illustrates an example embodiment 170 of a process for detecting a third party transmission based on the channel condition during the punctured resource. The communication diagram is shown with STA A 172, STA B 174 and STA C 176.

As shown in the figure, STA A 172 is the transmitter STA which transmits PPDU1 182 with its preamble 180, and with the punctured resource 186 and 188. STA C 176 is interested in transmitting to STA A and performs third party transmission detection during PPDU1 transmission. Initially no third party transmissions are detected 186. If STA C detects CCA busy 188 during the punctured resource, this indicates the presence of a third party transmission, and thus STA C cannot transmit to STA A. Otherwise, STA C may transmit to STA A.

This example shows how STA C detects 188 a third party transmission, for example the presence of PPDU2 192 with preamble 190 as sent by STA B, during the transmission time of PPDU1. It should be noted that the arrow shown in the figure represents that STA C received information (hears of) the PPDU transmission from STA A or STA B.

As shown in the figure, STA A sends a PPDU, i.e., PPDU1 182, with punctured resource. STA C receives and decodes PPDU1; and it should be appreciated that STA C may decide to only decode the preamble of PPDU1 to obtain punctured resource information. From this, STA C has obtained the location of the punctured resource during PPDU1 and performs channel sensing over the punctured resource. When only STA A is transmitting, STA C senses the channel is idle (without CCA busy) during the punctured resource 186. If there is another STA, i.e., STA B 174, sending a PPDU2, shown as PPDU2 192 when STA A is transmitting, then STA C senses CCA busy during the punctured resource 188 (with CCA busy). As a result, STA C is not able to preempt STA A. It will be noted that STA C may or may not be the intended receiver of PPDU1.

It is possible that STA B sends PPDU2 192 when STA B is the intended receiver of PPDU1 and is sending PPDU2 for a full duplex transmission, or when STA A is a hidden node with respect to STA B, or when PPDU2 is a preemption request sent by STA B.

4.2.2. Example 2 of Third Party Detection

Figure 8:
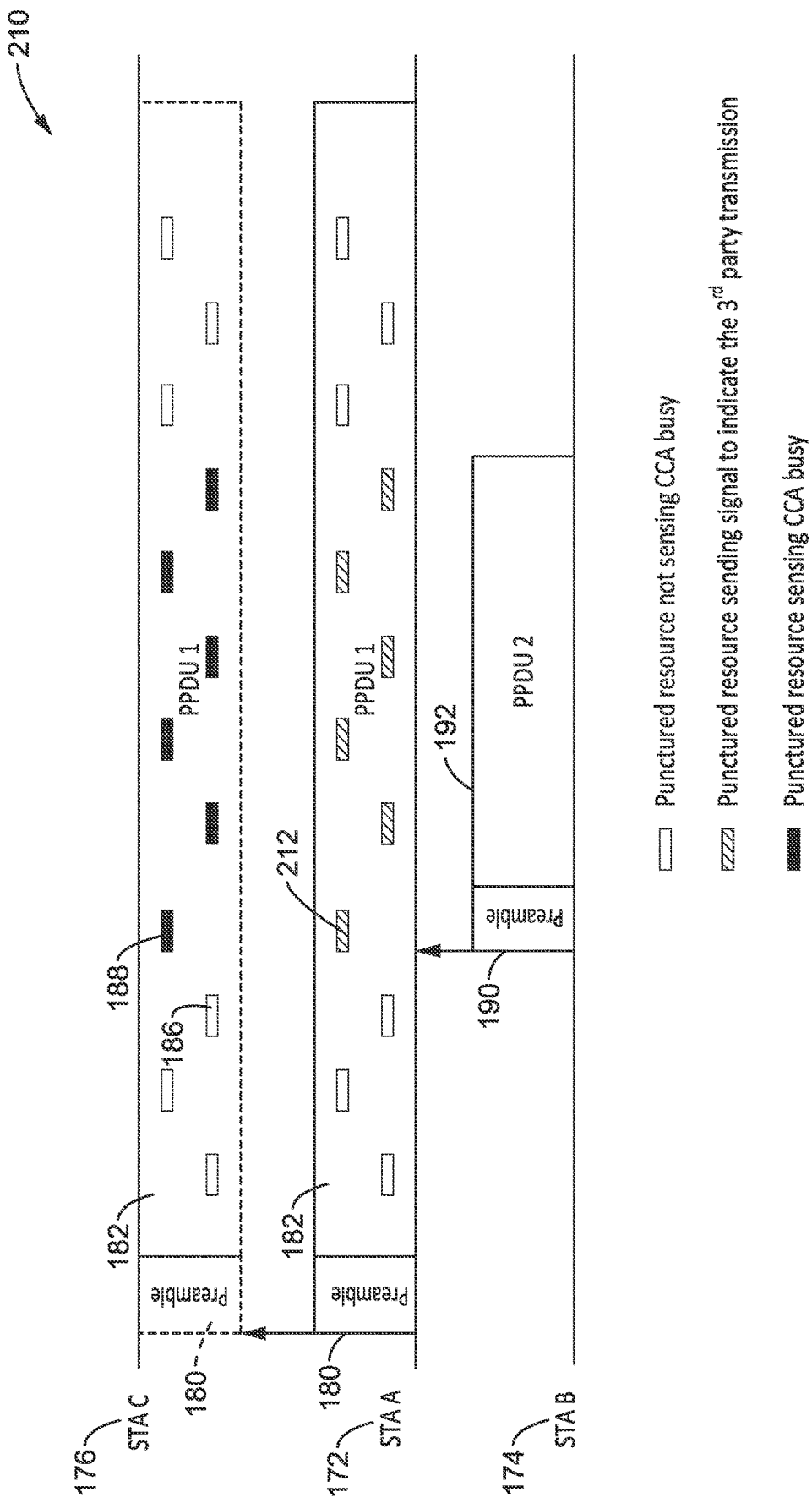
FIG. 8 is a communication diagram of a transmitter STA sending a signal over the punctured resource to inform other STAs of its third party transmission detection according to at least one embodiment of the present disclosure.

FIG. 8 illustrates an example embodiment 210 of a transmitter STA sending a signal over the punctured resource to inform other STAs of its third party transmission detection. The STAs involved are the same as those of FIG. 7.

As shown in the figure, STA A is the transmitter STA which transmits PPDU1 182 with its preamble 180, and with at least one punctured resource, shown at different times 186 and 188. STA C is interested in transmitting to STA A and performs a third party transmission detection during PPDU1 transmission 182. If STA C detects CCA busy 188 during the punctured resource, it detects a third party transmission and cannot transmit to STA A. Otherwise, STA C may transmit to STA A. This example illustrates the manner in which STA A detects a third party transmission, such as PPDU2 192 with preamble 190 as sent by STA B, during the transmission time of PPDU1 and forwards this third party transmission information over punctured resource to inform STA C, if STA A detects 212 a third party transmission. Otherwise, STA A does not send this signal over the punctured resource. It will be noted that the arrow shown in the figure represents that STA C hears (receives) of the PPDU transmission from STA A or STA B.

This example shows that the transmitter STA sends a signal over the punctured resource of PPDU1 to inform STA C of the third party transmission. As shown in the figure, STA A sends a PPDU, i.e., PPDU1 with punctured resource. STA C hears and decodes PPDU1. STA C thus has obtained the location of the punctured resource of PPDU1 and performs channel sensing over the punctured resource.

When only STA A is transmitting, STA C senses the channel is idle during the punctured resource 186 (without CCA busy). If there is another STA, such as STA B sending PPDU2 192, when STA A is transmitting, then STA C does not sense CCA busy over the punctured resource due to it being a hidden node with respect to STA B. However, STA A hears the PPDU2 transmission. During the time of PPDU2 transmission, STA A sends a signal over the punctured resources to indicate that there is a third party transmission (i.e., PPDU2), and it is not able to receive signal (e.g., from STA C) during that time. Then, STA C stops trying to preempt STA A.

It should be noted that STA C may or may not be the intended receiver of PPDU1.

4.2.3. Example 3 of Third Party Detection

Figure 9:
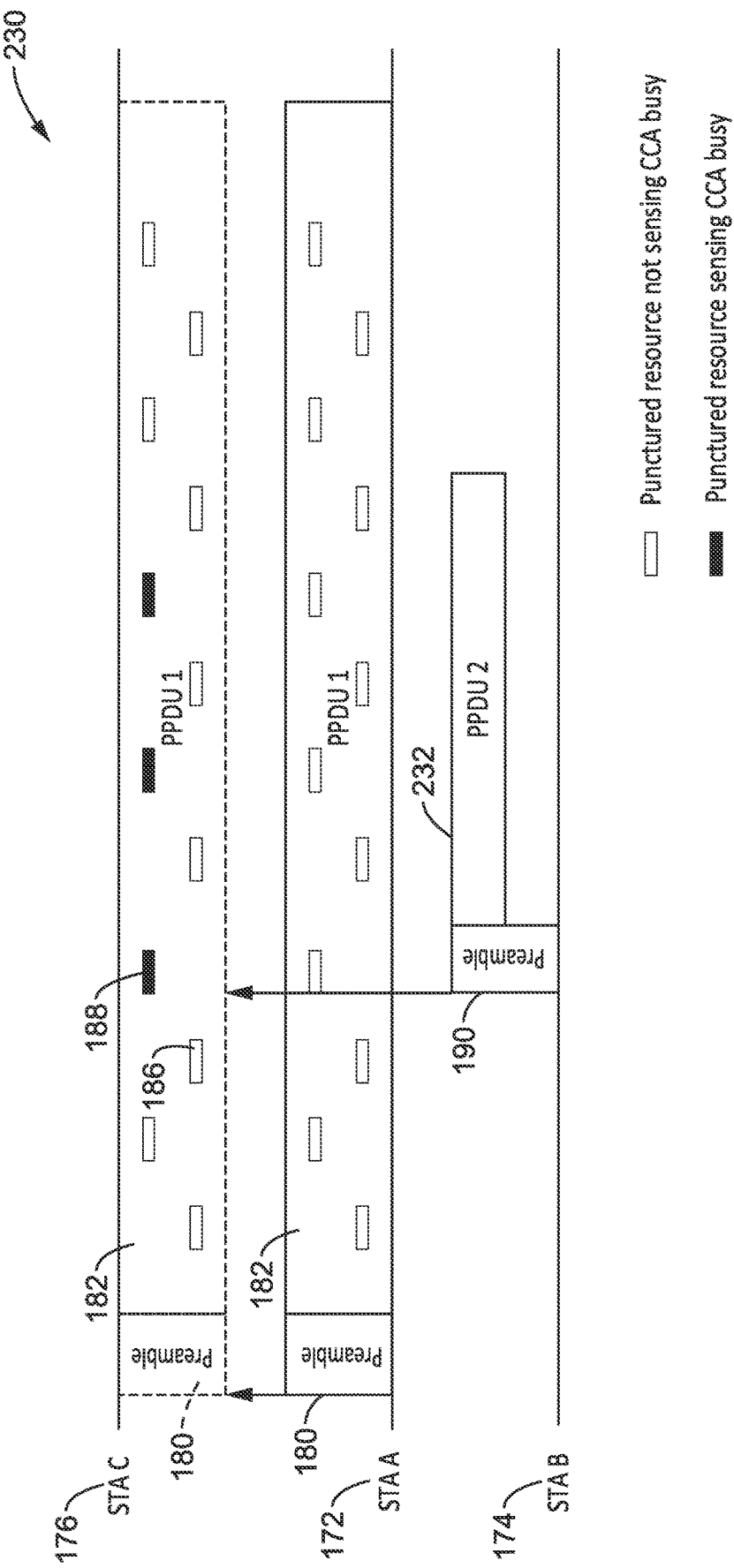
FIG. 9 is a communication diagram of a STA detecting a third party transmission on a partial channel resource according to at least one embodiment of the present disclosure.

FIG. 9 illustrates an example embodiment 230 of a STA detecting a third party transmission on a partial channel resource. The STAs involved are the same as shown in FIG. 8.

As shown in the figure, STA A is the transmitter STA which transmits PPDU1 182 with its preamble 180, and with at least one punctured resource. STA C is interested in transmitting to STA A and performs third party transmission detection during PPDU1 transmission. Initially there is no 186 CCA busy detected through the punctured resource. If STA C detects CCA busy 188 during the punctured resource, it recognizes a third party transmission is taking place and cannot transmit to STA A over the partial channel where that punctured resource is located. Meanwhile, STA C may transmit to STA A over the partial channel where STA C senses the punctured resources as idle. This example shows how STA C detects a third party transmission, i.e., PPDU2 232 with preamble 190, sent by STA B, during the transmission time of PPDU1. It should be noted that the arrow shown in the figure represents that STA C hears of (receives information on) the PPDU transmission from STA A or B.

As shown in the figure, STA A sends a PPDU, exemplified as PPDU1 with punctured resource. STA C hears and decodes PPDU1. Thus, STA C knows (has information on) the location of the punctured resource of PPDU1 and performs (runs) channel sensing over the punctured resource. When only STA A is transmitting, STA C senses the channel is idle during the punctured resource at time 186 (without CCA busy). If there is another STA, i.e., STA B, sends a PPDU2 232 when STA A is transmitting over some RUs, then STA C senses CCA busy 188 over the punctured resource on those RUs (with CCA busy). Then, STA C is not able to transmit to STA A using those RUs in which the punctured resource is CCA busy. STA C may utilize the other RUs whose punctured resource is idle, such as for performing preemption.

It should be appreciated that STA C may or may not be the intended receiver of PPDU1.

5.0. Full Duplex (FD) Transmission Approach

This section describes an approach to launch full duplex transmission between two full duplex capable STAs. When launching a full duplex transmission, the FD originator STA indicates the start of a full duplex transmission in the preamble of the PPDU it sends to the FD recipient STA. The FD recipient STA receives the preamble of the PPDU and realizes it is the FD recipient STA. Then, it commences to send a PPDU to the FD originator STA for full duplex transmission.

This section also discusses the self-interference estimation of the FD recipient STA. When the FD originator STA sends a PPDU that allows FD transmission, it sends a signal following the preamble of the PPDU. The signal can be as follows. (a) A signal that is pre-determined and recognized by the FD recipient STA so that the FD recipient STA can cancel the signal and obtain a self-interference estimation. (b) The signal may be orthogonal to the PPDU that STA C is to transmit so that STA C does not need to cancel the signal, but performs the self-interference estimation.

This section also describes a mechanism in which the FD originator STA can request that the FD recipient STA leave some RUs empty (not used for transmitting) so that other STAs can transmit preemption requests, and optionally related information, over those RUs.

5.1. FD Transmission

5.1.1. FD Transmission from Originator STA

Figure 10:
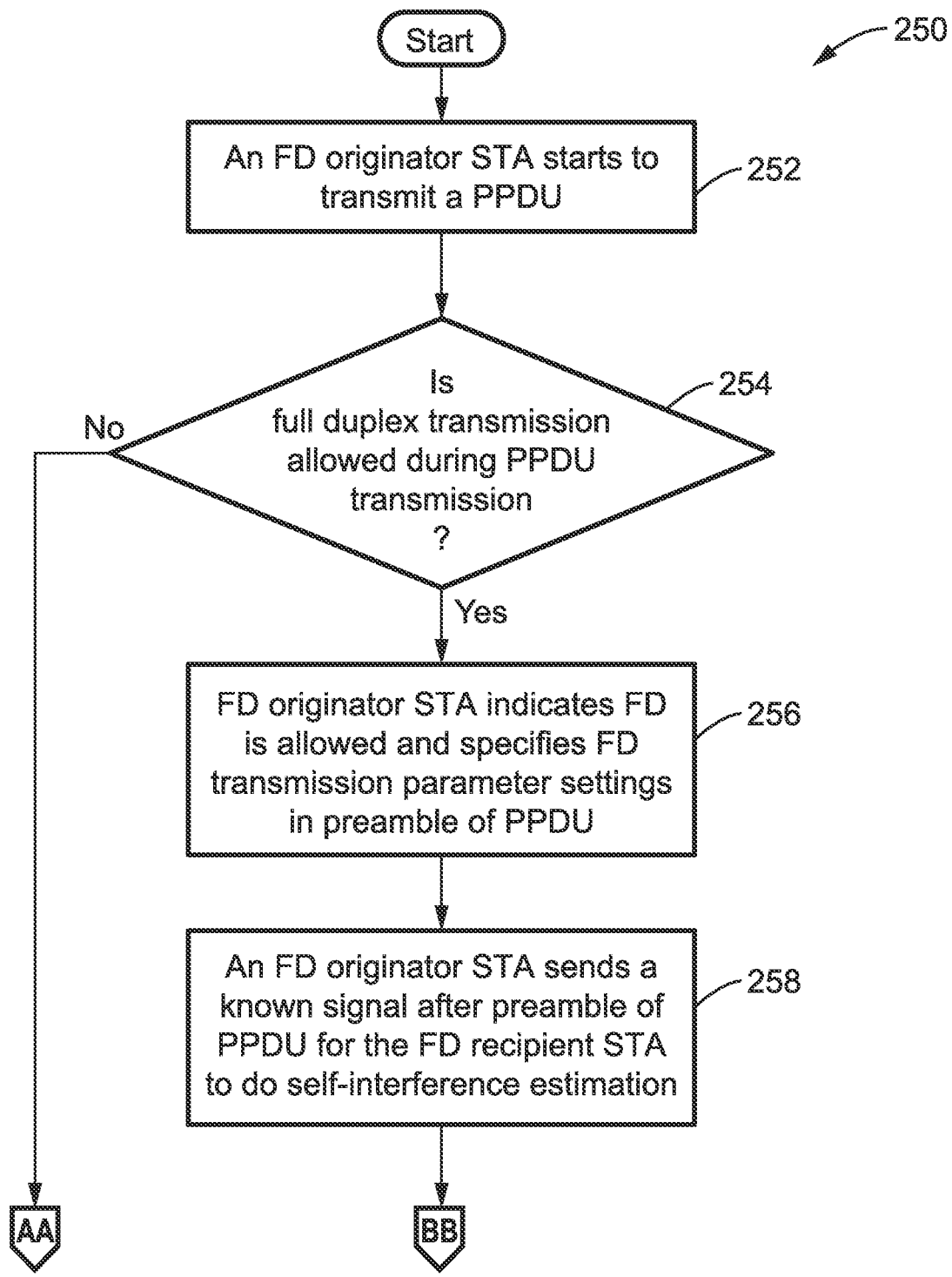
FIG. 10 and FIG. 11 is a flow diagram of a FD originator STA launching a full duplex transmission according to at least one embodiment of the present disclosure.
Figure 11:
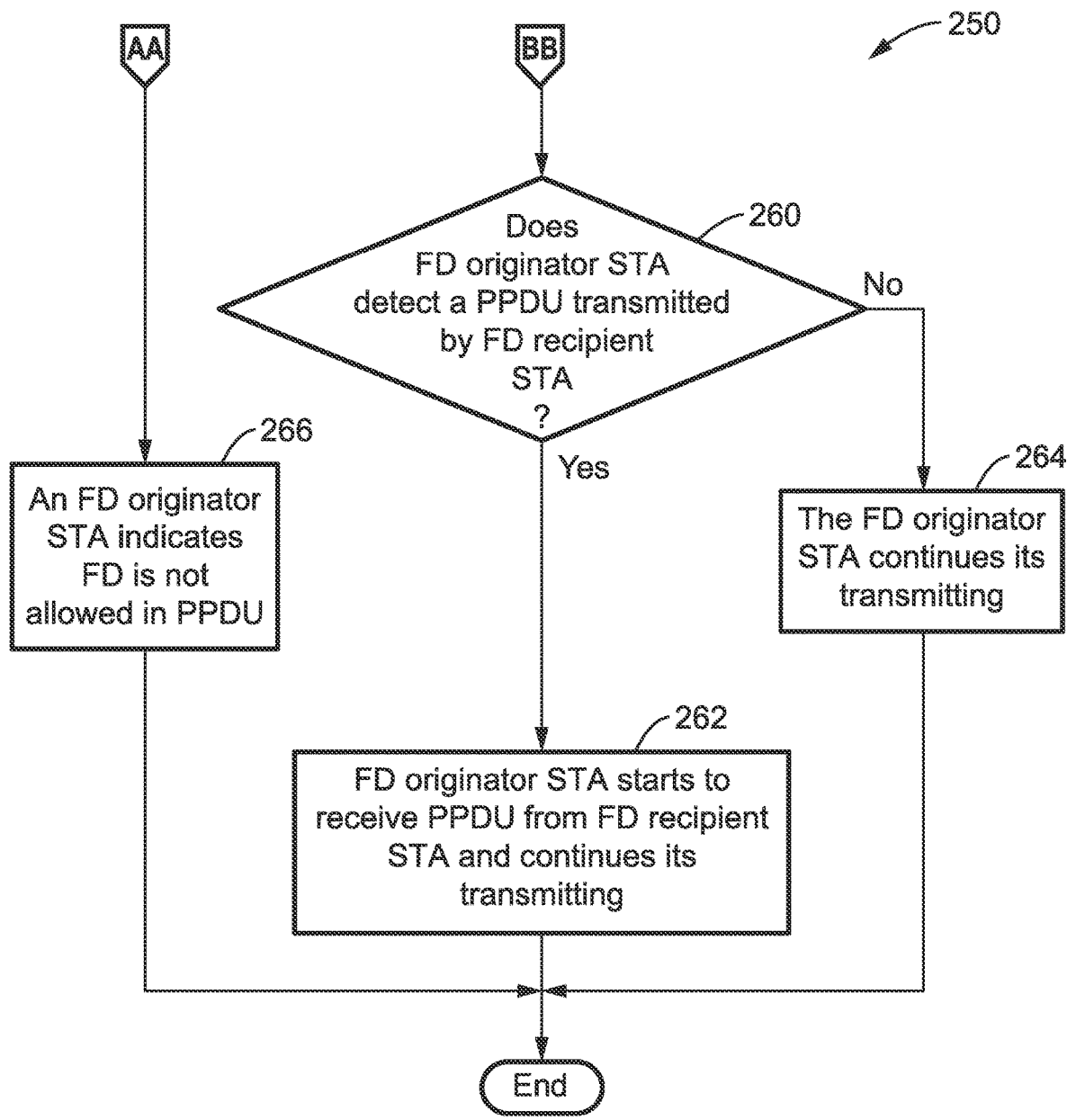

FIG. 10 and FIG. 11 illustrate an example embodiment 250 of a FD originator STA launching a full duplex transmission. A FD originator STA transmits 252 a PPDU to a FD recipient STA; and within the PPDU it indicates whether the FD transmission is allowed in the PPDU.

It determines 254 if full duplex transmission is to be allowed during the PPDU transmission. If FD is not allowed, then execution moves to block 266 of FIG. 11 in which the FD originator indicates that FD is not allowed in the PPDU, and the process ends. It should be noted that the FD originator may use a legacy preamble (with no FD transmission parameter settings) to indicate that the FD transmission is not allowed.

Otherwise, if FD is allowed at block 254, then at block 256 the FD originator STA embeds the full duplex transmission parameter settings, such as FD allowance indication, transmission power of the FD originator STA, expected receive power from the FD recipient STA, the punctured resource information of the PPDU, reserved channel resource for preemption, in the PPDU (e.g., PPDU preamble).

Then after the FD originator sends a preamble of the PPDU, it sends 258 a known signal so that the FD recipient STA performs self-interference estimation during the known signal transmission time.

Then at check 260 in FIG. 11, it is determined if the FD originator STA detects a PPDU transmitted by the FD recipient STA.

If it detects a PPDU, then at block 262 the FD originator commences to receive the PPDU from the FD recipient STA. Regardless of whether the FD originator STA receives the PPDU from the FD recipient STA, it continues its transmitting.

However, if at check 260 a PPDU by the FD recipient STA was not detected, then at block 264 the FD originator STA continues its transmissions.

5.1.2. FD Transmission from Perspective of Recipient STA

Figure 12:
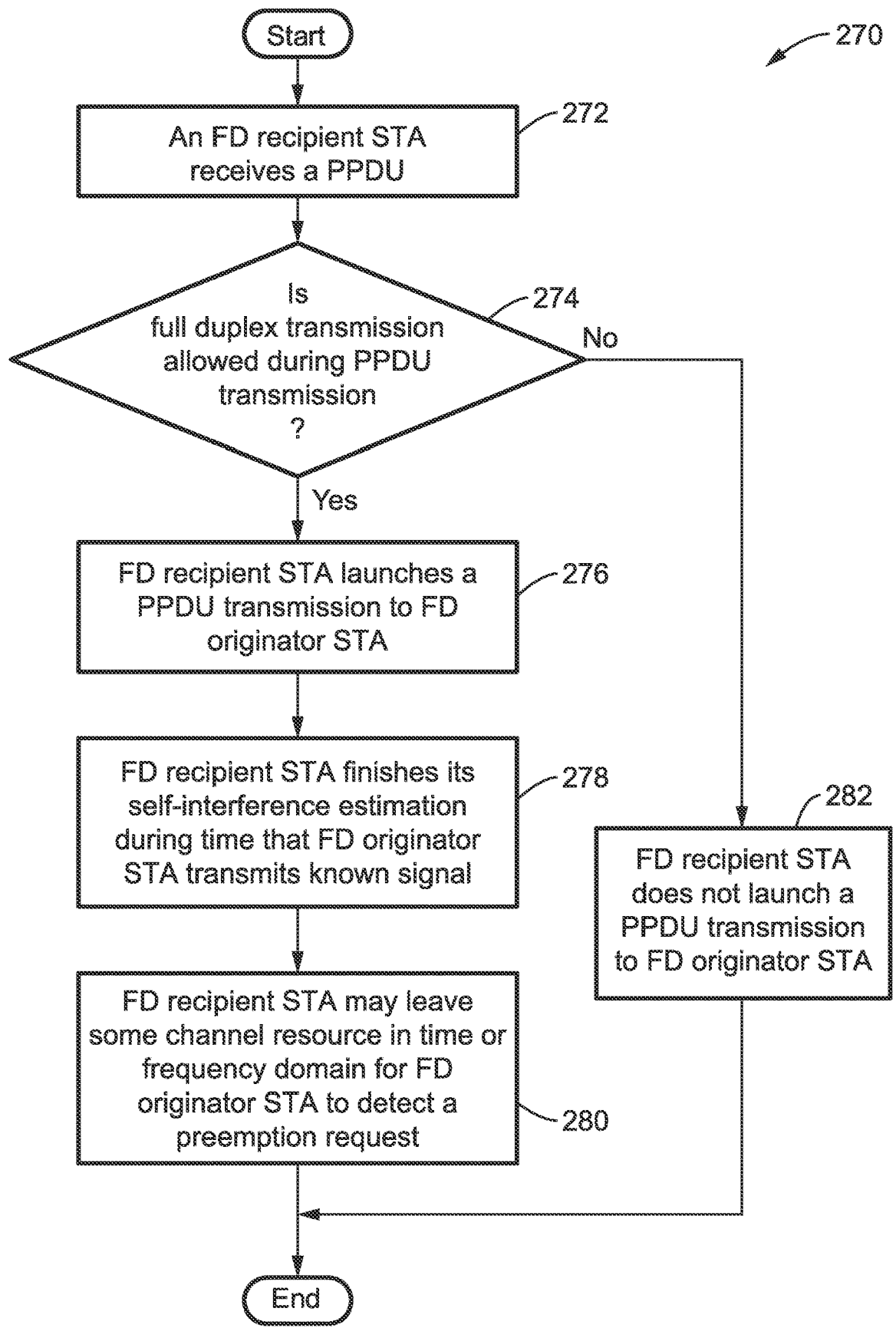
FIG. 12 is a flow diagram of a FD recipient STA commencing a full duplex transmission according to at least one embodiment of the present disclosure.

FIG. 12 illustrates an example embodiment 270 of a FD recipient STA commencing a full duplex transmission launched by a FD originator STA.

The FD recipient STA receives 272 a PPDU. A check 274 determines from the PPDU if full duplex transmission is allowed. If it is not allowed, then at block 282, the FD recipient STA does not transmit during the PPDU transmission of the FD originator STA.

Otherwise, if the FD transmission is allowed during the PPDU, then the recipient STA starts 276 a PPDU transmission to the FD originator STA according to the full duplex transmission parameter settings in the PPDU received from FD originator STA. When the FD recipient STA starts transmitting the PPDU, it finishes its self-interference estimation 278 during the time that the FD originator STA transmits the known signal. The FD recipient STA may reserve 280 a portion of the channel resources in the time and/or frequency domain which are not to be transmitted in its PPDU. Then, the FD originator STA can detect a preemption request over the reserved channel resource. The reserved channel resource can be indicated in the PPDU transmitted by the FD originator STA. In at least one embodiment/mode/option the reserved channel resource is pre-negotiated.

5.2.1. Example 1 of Full Duplex Transmission

Figure 13:
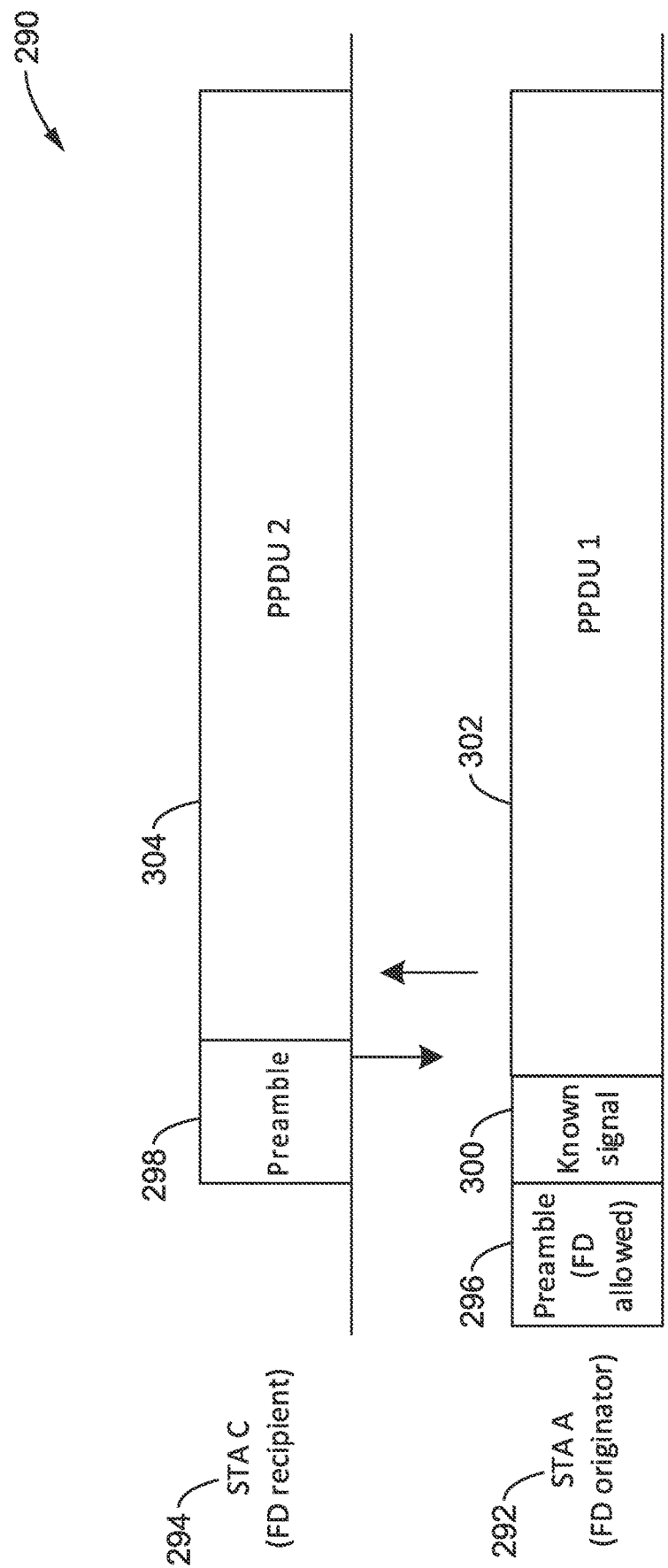
FIG. 13 is a communication diagram of a full duplex transmission of PPDU1 according to at least one embodiment of the present disclosure.

FIG. 13 illustrates an example embodiment 290 of a full duplex transmission of PPDU1. STA A 292 is the FD originator STA and STA C 294 is the FD recipient STA. STA A accesses the channel and starts to transmit a PPDU 1 302 to STA C. The preamble 296 of PPDU 1 indicates that full duplex transmission is allowed during the PPDU1 time. STA A performs its self-interference check during the preamble time of PPDU1.

STA C receives the preamble of PPDU1 from which it can recognize (know) that it is allowed to transmit PPDU2 304, with its preamble 298, to STA A for full duplex transmission. When STA A sends a known signal 300 after it finishes preamble 296 of PPDU1, STA C can commence to send the preamble 298 of PPDU2 304 and performs its self-interference estimation during the known signal time of PPDU1. Then, STA A and STA C exchange PPDU1 and PPDU2 at the same time.

The preamble of PPDU1, e.g., LTF fields in the preamble, can be used by STA A for self-interference estimation, for example to determine what the self-interference is at the receiver after reflecting from the environment. Meanwhile, the preamble of PPDU1, e.g., LTF fields in the preamble, can be utilized by STA C for channel estimation from STA A.

STA C receives the preamble of PPDU1 and recognizes that FD is allowed. Then, It can start its PPDU2 transmission, such as immediately after the end of the preamble of PPDU1. The known signal following the preamble of PPDU1, is according to the following options. (1) In at least one option, the known signal can consist of a predefined signal(s), such as LTF fields. STA C can cancel the signal of the known signal of PPDU1 due to its channel estimation when receiving preamble of PPDU1. Then, STA C can perform its self-interference estimation when it is transmitting the preamble of PPDU2. (2) In at least one other option it is also possible that the known signal is orthogonal to the signal that STA C is transmitting, such that STA C does not need to cancel it. For example, the known signal is transmitted based on one row of a P-Matrix and the preamble of PPDU2 uses another row of the same P-matrix. The P-matrix can be shared between STA A and STA C before the full duplex transmission.

Then both STA A and STA C can cancel their self-interference and start a full duplex transmission. STA A starts to transmit the payload of PPDU1 and receives the payload of PPDU2. STA C starts to transmit the payload of PPDU2 and receives the payload of PPDU1.

The duration of the known signal of PPDU1 should provide sufficient time for STA C to perform the self-interference estimation for PPDU2. In order to do so, it is possible that the duration of the known signal for PPDU1 is the same as, or longer than, the duration of the preamble for PPDU2. Alternatively, the preamble for PPDU2 should end at the same time, or earlier, than the known signal of PPDU1.

The alignment of OFDM symbol boundaries between PPDU1 and PPDU2 may be required. In addition, STA A may set the level of transmission power of STA C in the preamble of PPDU1.

Figure 24:
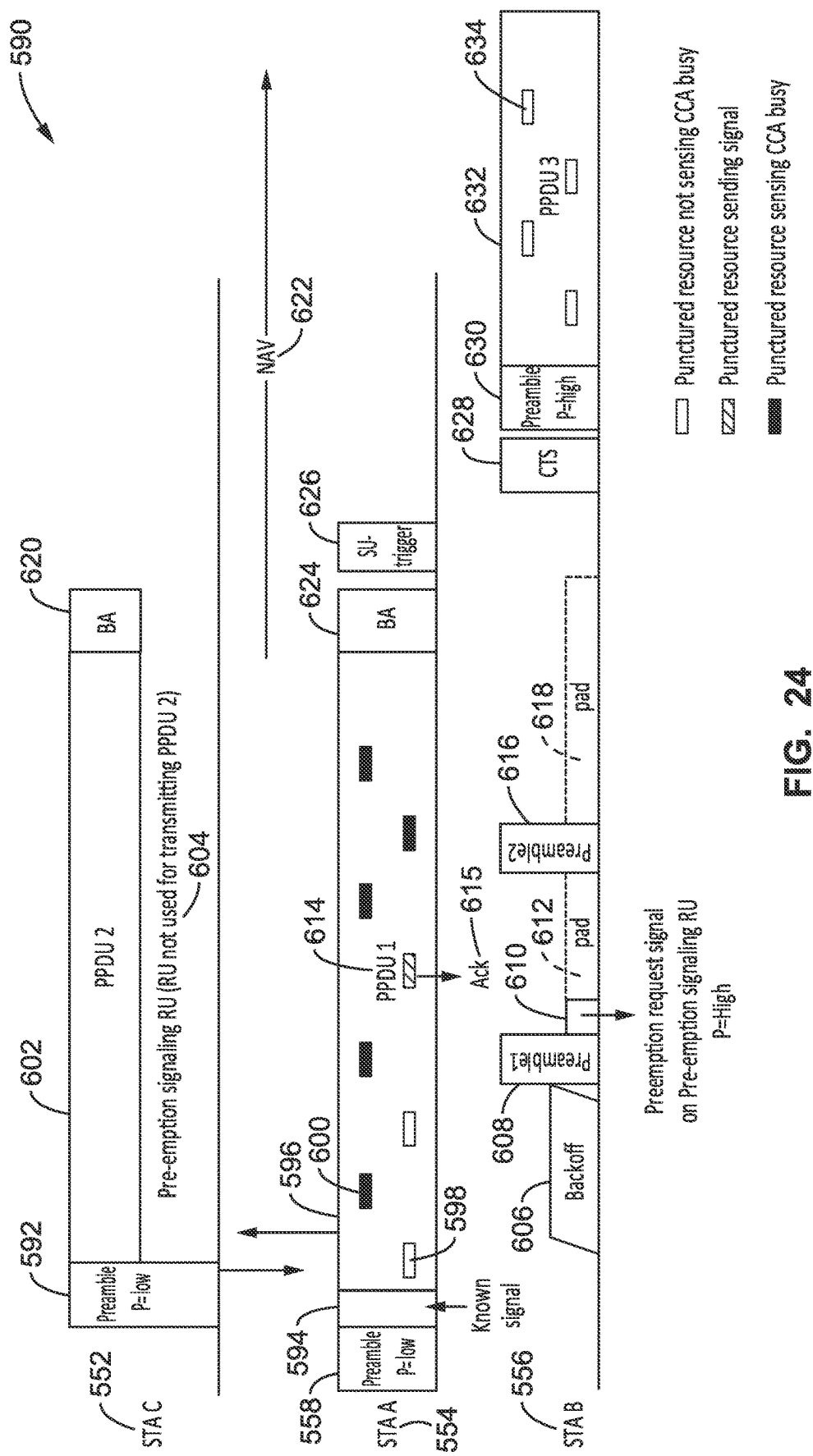
FIG. 24 is a communication diagram of a sixth example of preemption and/or interruption of FD transmission according to at least one embodiment of the present disclosure.

It should be noted that it is possible that PPDU1 carries the Block Acks (BAs) for the MAC Protocol Data Units (MPDUs) in PPDU2, and PPDU2 carries the BAs for the MPDUs in PPDU1. An example is given in FIG. 24 showing Example 6 of preemption/interruption of FD transmission.

5.2.2. Example 2 of Full Duplex Transmission

Figure 14:
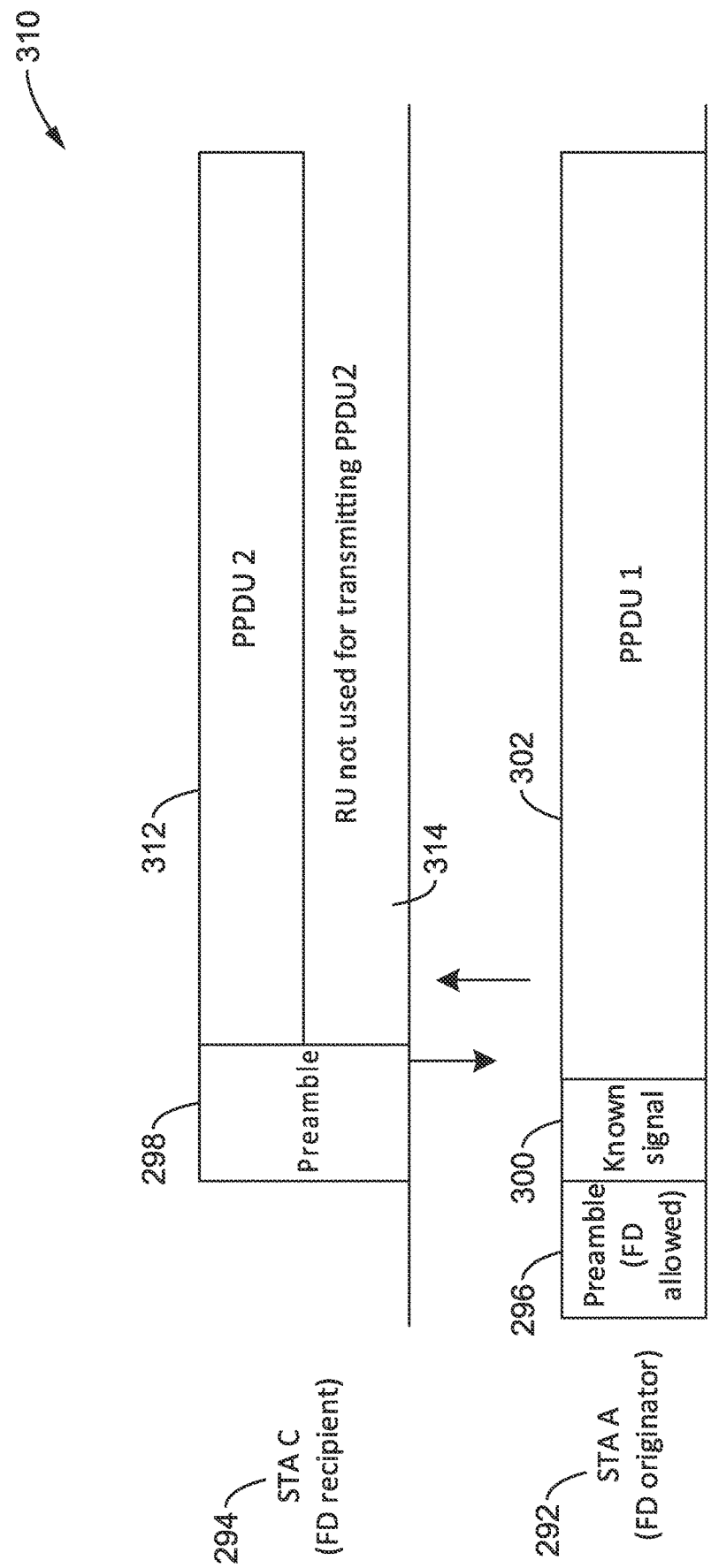
FIG. 14 is a communication diagram of a full duplex partial channel transmission according to at least one embodiment of the present disclosure.

FIG. 14 illustrates another example embodiment 310 of a full duplex partial channel transmission. Compared with the previous example, the example here depicts that STA A 292 requests that (asks) STA C 294 to leave an RU unused for transmitting PPDU2. STA A indicates this information in the preamble 296 of PPDU1 302. When STA C receives this information, it transmits preamble 298 but only uses a partial channel to transmit PPDU2 312, leaving the RU 314 indicated by PPDU1 as unused. The RU not being used for transmitting PPDU2, can thus be utilized for sending pre-emption requests by other STAs which will be explained later.

The preamble of PPDU1, for example the LTF fields of the preamble, can be utilized by STA A for self-interference cancellation estimation, such as STA A canceling the signal received from PPDU1 so that it can receive a PPDU from another STA while transmitting PPDU1. Meanwhile, the preamble of PPDU1, such as the LTF fields in the preamble, can be used by STA C for channel estimation from STA A.

STA C receives the preamble 298 of PPDU1 and from the information therein, it recognizes that FD is allowed. STA C can then commence its PPDU2 312 transmission, such as immediately after the end of preamble of PPDU1. Since there is a known signal 300, such as LTF, following the preamble of PPDU1, STA C can cancel the signal of the known signal of PPDU1 due to its channel estimation when receiving preamble of PPDU1. Then, STA C can perform self-interference cancellation as necessary when it is transmitting its preamble 298 of PPDU2.

Thus, both STA A and STA C can cancel their self-interference and start full duplex transmission. STA A starts to transmit the payload of PPDU1 and receives the payload of PPDU2. STA C starts to transmit the payload of PPDU2 and receives the payload of PPDU1.

It is possible that the duration of the known signal 300 of PPDU1 is the same as the duration of preamble 298 of PPDU2 312. Alternatively, the preamble 298 of PPDU2 312 and the known signal 300 of PPDU1 should end at the same time. As shown in the figure, STA C does not use all of the RUs for transmitting PPDU2; as can be indicated in the parameter settings of full duplex transmission for PPDU1. For example, STA A sets the RU for FD indication field to a first state (e.g., "0") in PPDU1 whereby the format of PPDU1 is as shown in FIG. 29. In this case, another STA can send a preemption request to STA A through an RU 314 that is not being utilized by PPDU2.

An alignment of OFDM symbols between PPDU1 and PPDU2 may be required to minimize inter-channel interference between PPDU1 and PPDU2. In addition, STA A may set a transmission power level for STA C in the preamble of PPDU1.

5.3. Pre-Emption and/or Interruption of FD Transmission

This section explains how the preempting STA sends a preemption request to the preempted STA to launch a preemption transmission. The preempting STA indicates the priority of its preemption transmission in the preemption request. In at least one embodiment/mode/option, the preemption transmission is only allowed when the priority of the preemption transmission is higher than the ongoing transmission.

As discussed previously, the preempted STA can send a PPDU with a punctured resource. The preempting STA can sense the channel (or partial channel) during the punctured resource and sends a preemption request over the channel (or partial channel) if there is no third party transmission.

If the preempted STA is performing a FD transmission, it can request (ask) that the FD recipient STA leave at least one RU empty so that the preemption request can be transmitted through that RU.

The preempting STA can send the preemption request to reserve a short period of the TXOP to occupy the channel and wait for a response from the preempted STA.

When the preempted STA receives a preemption request, it either accepts or rejects the request. If it accepts the request, it interrupts its ongoing transmission. Otherwise, it continues its ongoing transmission.

If the preempting STA preempts a FD transmission of the preempted STA, the preempted STA is the FD originator STA, and it informs its FD recipient STA to interrupt the transmission.

If the preempted STA accepts the preemption request, it can send a signal through the punctured resource to indicate the acceptance of the preemption request, so as to inform the FD recipient STA to interrupt the ongoing FD transmission, and thus to occupy the channel to avoid other preemption requests.

The preempting STA may start the preemption transmission immediately after the interruption of the ongoing transmission of the preempted transmission. Alternatively, the preemption transmission can be triggered by the preempted STA.

It should be noted that the preempted STA may or may not be the intended receiver of the preemption transmission requested by the preempting STA. When the preempting STA sends the preemption request, it may or may not be the intended receiver of the ongoing PPDU transmission of the preempted STA. In the examples, the preempting STA is STA B, and the preempted STA is STA A.

5.3.1. Interruption of Ongoing FD Transmission

5.3.1.1. Interruption of FD Recipient STA

Figure 15:
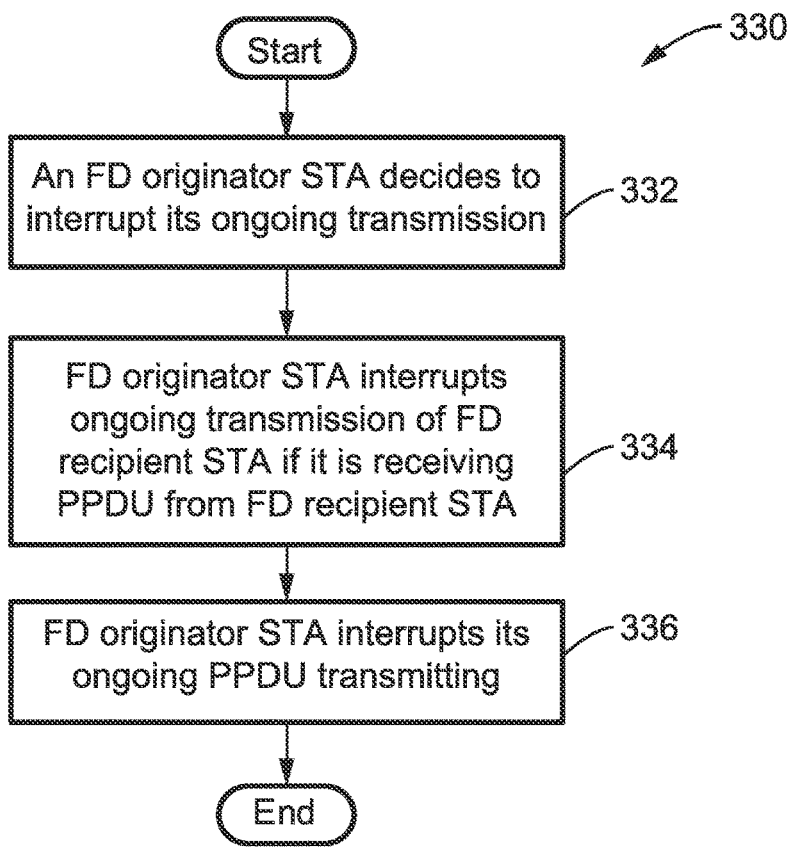
FIG. 15 is a flow diagram a FD originator STA interrupting its ongoing full duplex transmission according to at least one embodiment of the present disclosure.

FIG. 15 illustrates an example embodiment 330 of a FD originator STA interrupting its ongoing full duplex transmission.

When a FD originator STA decides 332 to interrupt its ongoing full duplex transmission, it interrupts 334 the ongoing transmission of FD recipient STA if it is receiving PPDU from FD recipient STA. For example, it can send a signal to the FD recipient STA to interrupt the ongoing transmission. It should be noted that it is possible that the FD originator STA sends another interruption signal to the FD recipient STA if the FD recipient STA did not interrupt its ongoing transmitting according to the previous interruption signal.

Then FD originator STA interrupts 336 its own ongoing PPDU transmission. The FD originator can perform this as follows. (a) It can interrupt its ongoing PPDU transmission at any time. A DTX confirmation signal may be transmitted to indicate the interruption of the ongoing PPDU. (b) It can interrupt its ongoing PPDU at the end of one MPDU of the PPDU. (c) It can finish its current PPDU transmission and then avoid starting another PPDU transmission within the current TXOP.

5.3.1.2. Interruption of Ongoing FD Transmission by FD Recipient

Figure 16:
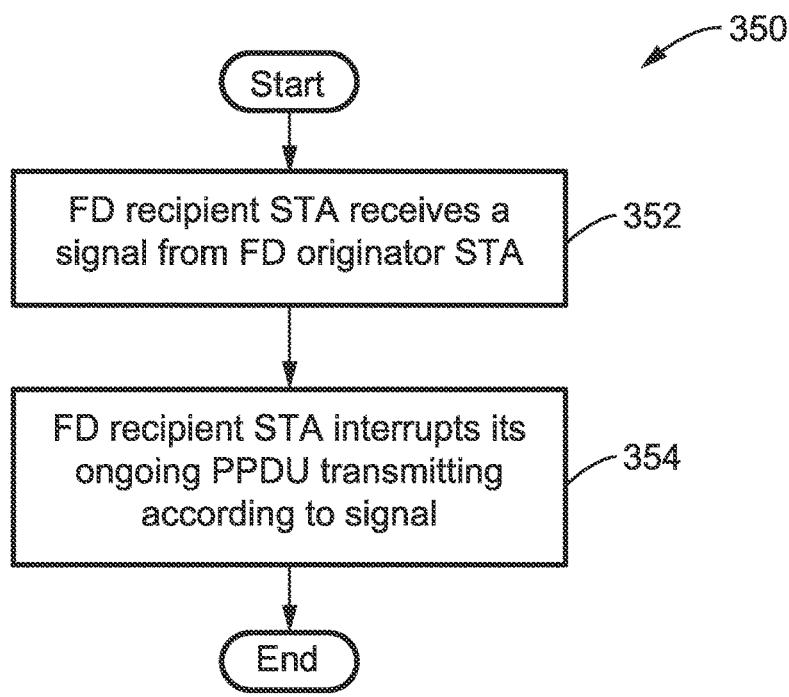
FIG. 16 is a flow diagram of a FD recipient STA interrupting its ongoing full duplex transmission according to at least one embodiment of the present disclosure.

FIG. 16 illustrates an example embodiment 350 of a FD recipient STA interrupting its own ongoing full duplex transmission.

When a FD recipient STA receives 352 a signal from the FD originator STA to interrupt the ongoing transmission, then the FD recipient STA interrupts 354 its ongoing PPDU transmissions.

5.3.1.3. Preemption of PPDU by Preempting STA

Figure 17:
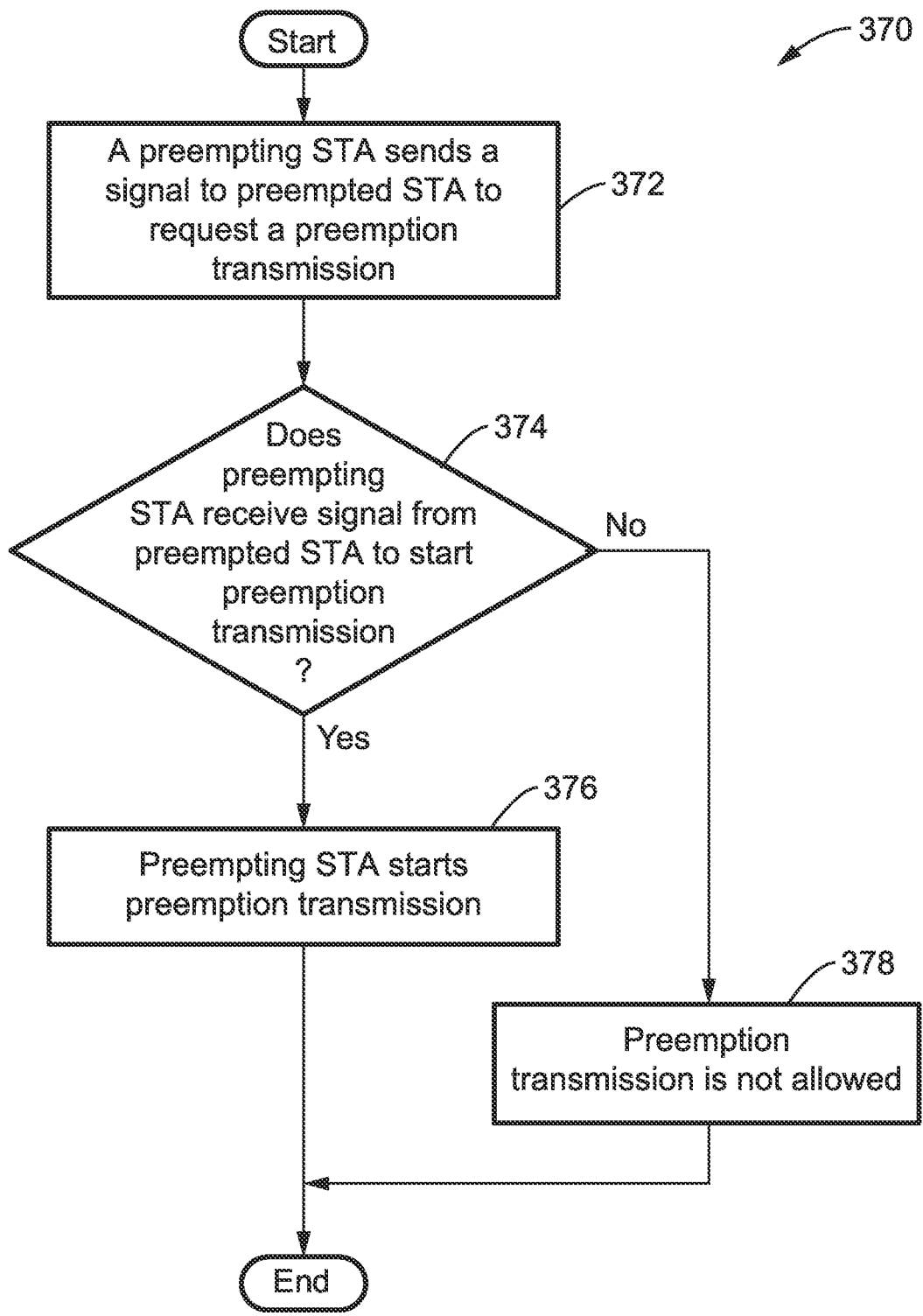
FIG. 17 is a flow diagram of a preempting STA launching a preemption transmission according to at least one embodiment of the present disclosure.

FIG. 17 illustrates an example embodiment 370 of a preempting STA launching a preemption transmission.

A preempting STA sends 372 a signal to the preempted STA to request a preemption transmission. A check 374 determines if the preempting STA receives a signal from the preempted STA to start the preemption transmission. If the condition is met, then at block 376 it starts the preemption transmission. Otherwise, execution reaches block 378 and the preemption transmission is not allowed.

In at least one embodiment/mode/option, the preempting STA does not send a preemption request if the Relative Signal Strength Indication (RSSI) at the preempting STA is higher than a given threshold even if the preempting STA senses channel idle over the punctured resource of the PPDU transmission of the preempted STA.

If the preempted STA is a FD originator STA and performing full duplex transmission, then the preempting STA can only sense the punctured resource over the RU that is not being used by the FD recipient STA for transmitting.

5.3.1.4. Preemption of PPDU at Preempted STA

Figure 18:
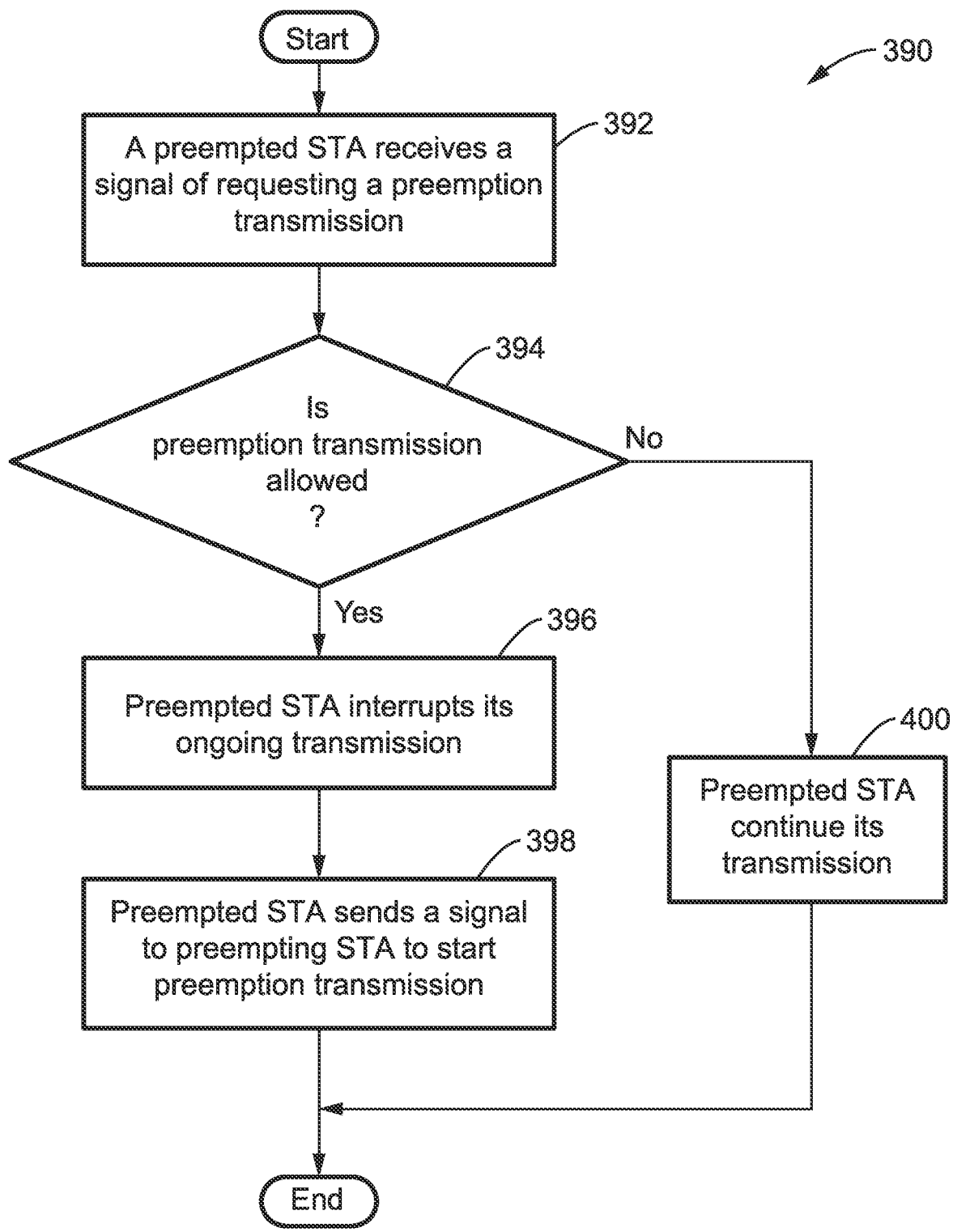
FIG. 18 is a flow diagram of a preempted STA accepting or rejecting a preemption transmission according to at least one embodiment of the present disclosure.

FIG. 18 illustrates an example embodiment 390 of a preempted STA accepting or rejecting a preemption transmission.

A preempted STA receives 392 a signal from the preempting STA to request a preemption transmission. The preempted STA makes a decision 394 to accept or reject the preemption transmission request. For example, if the priority of the preemption transmission is higher than the ongoing transmission of preempted STA, it may accept the request and execution moves on to block 396; otherwise, it rejects the request and execution moves to block 400.

If the preempted STA accepts the preemption transmission request, it interrupts 396 its ongoing transmission. The procedure of interruption of a PPDU transmission can be the same as shown in FIG. 15 and FIG. 16. Then, the preempted STA sends 398 a signal to the preempting STA to start preemption transmission.

If the preempted STA rejects the preemption transmission request at check 394, then the preempted STA continues 400 its ongoing transmissions.

5.4. Backoff Procedure of Preempting STA

When a preempting STA is to preempt an ongoing transmission, it can perform (run) a backoff procedure to obtain (gain) channel access. The preempting STA only senses the channel condition during the punctured resource as indicated by the ongoing PPDU transmitted by the preempted STA during the backoff procedure. If the channel condition during the punctured resource is idle for a backoff slot time, then the backoff counter is decremented (e.g., by one). Otherwise, the backoff counter is not decremented. The preempting STA gains channel access when the backoff counter reaches zero with the channel still idle.

If the preempted STA is performing a FD transmission, then the preempting STA only senses the channel condition during the punctured resource on the partial channel (RU) that is not used by the FD recipient STA of the FD transmission.

The backoff procedure for preemption can either be independent from, or part of, the regular EDCA as described below. (a) The backoff procedure for preemption can be independent from the backoff procedure used for regular EDCA (or CSMA/CA) channel contention. The backoff procedure for preemption is only used when the preempting STA contends for the channel for a preemption transmission. When the preempting STA does not contend for the channel to perform a preemption transmission, then the backoff counter for preemption can be either reset or paused. (b) The preempting STA can allow the EDCAFs of some Traffic Identifiers (TIDs) to contend for the channel toward performing preemption. Those EDCAFs can commence, or continue, in their channel contention when the preempting STA decides to launch a preempting transmission for those TIDs.

5.4.1. Examples of Preemption/Interruption

5.4.1.1. Example 1 of Preemption/Interruption

Figure 19:
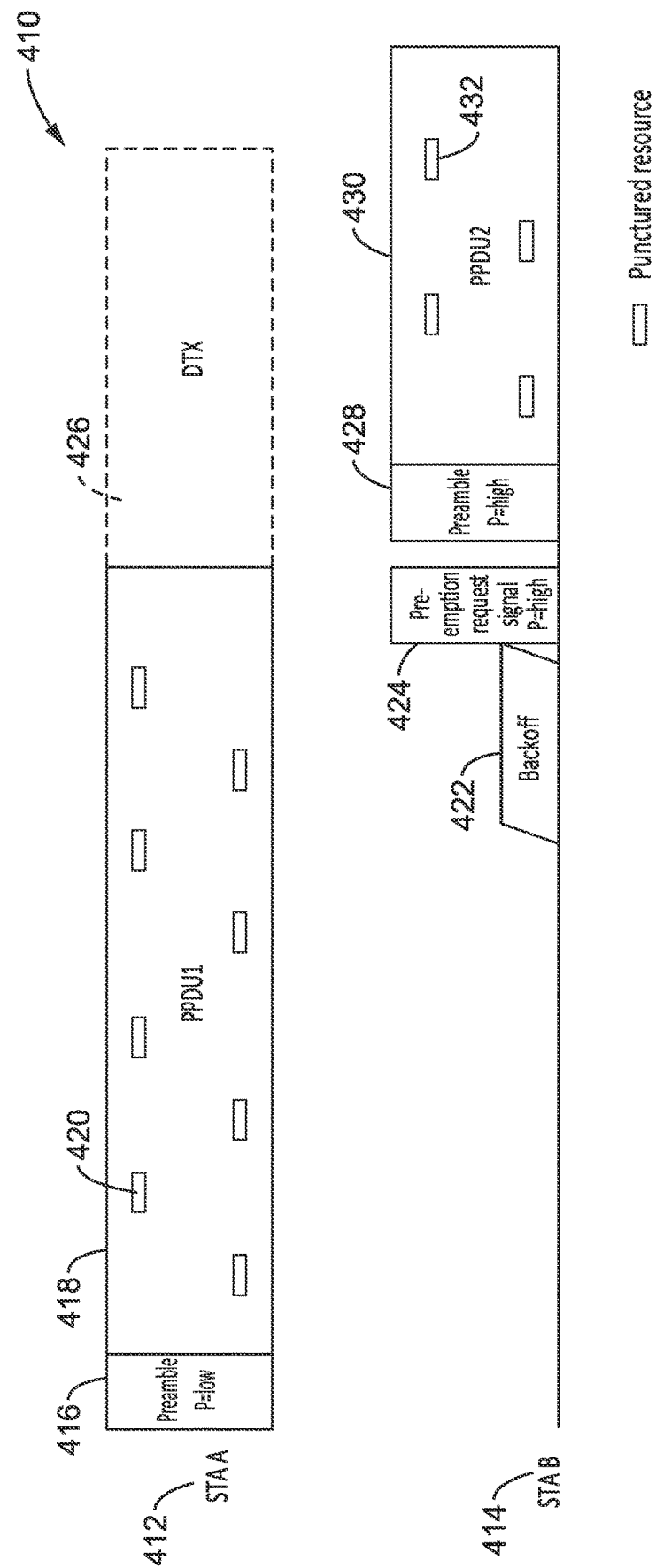
FIG. 19 is a communication diagram of a first example of preemption and/or interruption of FD transmission according to at least one embodiment of the present disclosure.

FIG. 19 illustrates an example embodiment 410 of preemption and/or interruption of FD transmission when the preempted STA is only transmitting. This example illustrates an example of the preempting STA B 414 sending a preemption request signal and starting its preemption transmission immediately after it detects the interruption of the PPDU transmission of the preempted STA A.

STA A 412 is the preempted STA and is shown transmitting preamble 416 which includes a priority indication, here set for lower priority, for PPDU1 418. PPDU1 embeds punctured resources 420. STA B 414 is the preempting STA, which contends for the channel by sensing channel status during the punctured resource of PPDU1. For example, STA B counts down the backoff 422 when it senses that the channel is idle during the punctured resource of PPDU1 and pauses the backoff when it senses channel busy during the punctured resource of PPDU1. Also, STA B may pause backoff 422 when STA A is transmitting PPDU1 with a higher priority than PPDU2. When the backoff 422 is counted down to zero, then STA B can access the channel and sends a signal 424 to request a preemption transmission. It should be noted that when STA B accesses the channel, it may wait several microseconds to align its OFDM symbol boundary with that of STA A.

As shown in the figure, STA B sends a preemption request signal 424 to STA A. In at least one embodiment/mode/option, the preemption preamble 428 indicates the priority (P=High in the figure) of the preemption transmission, depicted by PPDU2 430, as well as other parameters such as length of preemption transmission.

When STA A receives the preemption request signal 424, it decides on whether or not to accept the preemption request. In this example case, STA A accepts the request and immediately interrupts and discontinues its ongoing PPDU1 418 transmission, as seen by Discontinuous Transmission (DTX) 426. It will be noted that the DTX portion 426 of PPDU1 is that part of PPDU1 that is not transmitted due to this interruption.

If STA A interrupts its ongoing transmission immediately (e.g., within a IFS time), STA B can start the preemption transmission, as exemplified by PPDU2 430. STA B recognizes the interruption of PPDU1 by sensing that the channel is idle for a short period of time (e.g., a SIFS time) and thus STA B sends preamble 428, which in this example includes an indicator of high priority, and PPDU2 430, which itself may have a punctured resource.

In certain embodiments/modes/options the gap between the end time of the preemption request signal and the start time of the preamble of PPDU2 should not be longer than a selected period of time, such as for example the ACK/BA timeout, or two SIFS time periods. Alternatively, if STA B is FD capable then it may continue transmitting or hold the channel busy until it detects STA A interrupting the PPDU1 transmission. For example, STA B sends padding after the preemption request signal to continue (keep) transmitting or otherwise hold the channel busy.

5.4.1.2. Example 2 of Preemption/Interruption

Figure 20:
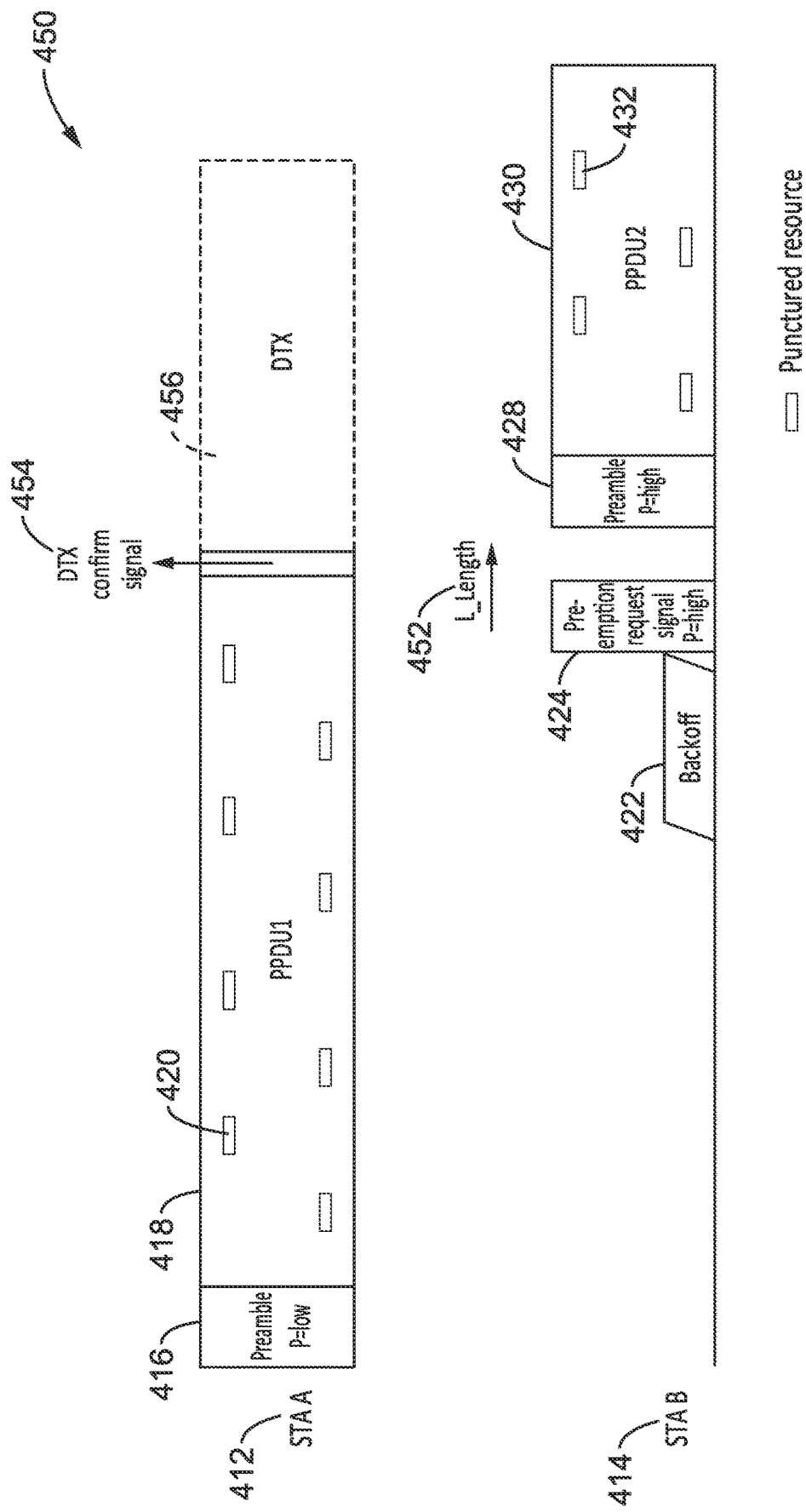
FIG. 20 is a communication diagram of a second example of preemption and/or interruption of FD transmission according to at least one embodiment of the present disclosure.

FIG. 20 illustrates an example embodiment 450 of preemption and/or interruption of a FD transmission when the preempted STA is only transmitting. This example demonstrates that when the preempted STA A receives a preemption request from the preempting STA B, it sends a DTX signal to indicate the interruption of its ongoing PPDU transmission. Then, the preempting STA recognizes the interruption of the PPDU transmission of the preempted STA and starts its preemptive transmission.

STA A 412 is the preempted STA and is transmitting PPDU1 418 with embedded punctured resources 420, which was preceded by preamble 416. STA B 414 is the preempting STA, which can contend for the channel by sensing channel status during the punctured resource of PPDU1. For example, STA B counts down the backoff 422 when it senses that the channel is idle during the punctured resource 420 of PPDU1, and pauses the backoff when it senses that the channel is busy. In at least one embodiment/mode/option STA B pauses its backoff when STA A is transmitting PPDU1 having a higher priority than PPDU2. When the backoff is counted down to zero, STA B can access the channel and send a signal to request a preemption transmission.

It should be noted that when STA B accesses the channel, it may wait several micro-seconds to align its OFDM symbol boundary with that of STA A.

As shown in the figure, STA B sends a preemption request signal 424 to STA A. The preemption request signal can indicate the priority (Priority (P)=high in the figure) of the preemption transmission, e.g., PPDU2 430. The preemption request 424 can also reserve a period of the TXOP, such as of length L_length 452, to prevent other STAs from accessing the channel in the figure while awaiting the DTX confirmation. When STA A receives the preemption request signal, it is shown ending its PPDU1 transmission and accepting the preemption request with a DTX confirm signal 454. The DTX portion 456 of PPDU1 is that portion of PPDU1 that is not transmitted due to the interruption. According to information in the DTX confirmation signal 454, both the receiver of PPDU1 and STA B can recognize (know) that PPDU1 has been interrupted.

If STA A interrupts its ongoing transmission within L_length of time, then STA B can commence its preemption transmission, depicted here as PPDU2 430 with its preamble 428. It will be seen that STA B can optionally contain a punctured resource(s) 432 in PPDU2.

STA A may decide when to allow interrupting its ongoing PPDU, i.e., PPDU1 within L_length time. If the value of L_Length time is set to a specific flag value, such as 0, that can indicate that STA A can interrupt its ongoing PPDU, i.e., PPDU1, at any time.

5.4.1.3. Example 3 of Preemption/Interruption

Figure 21:
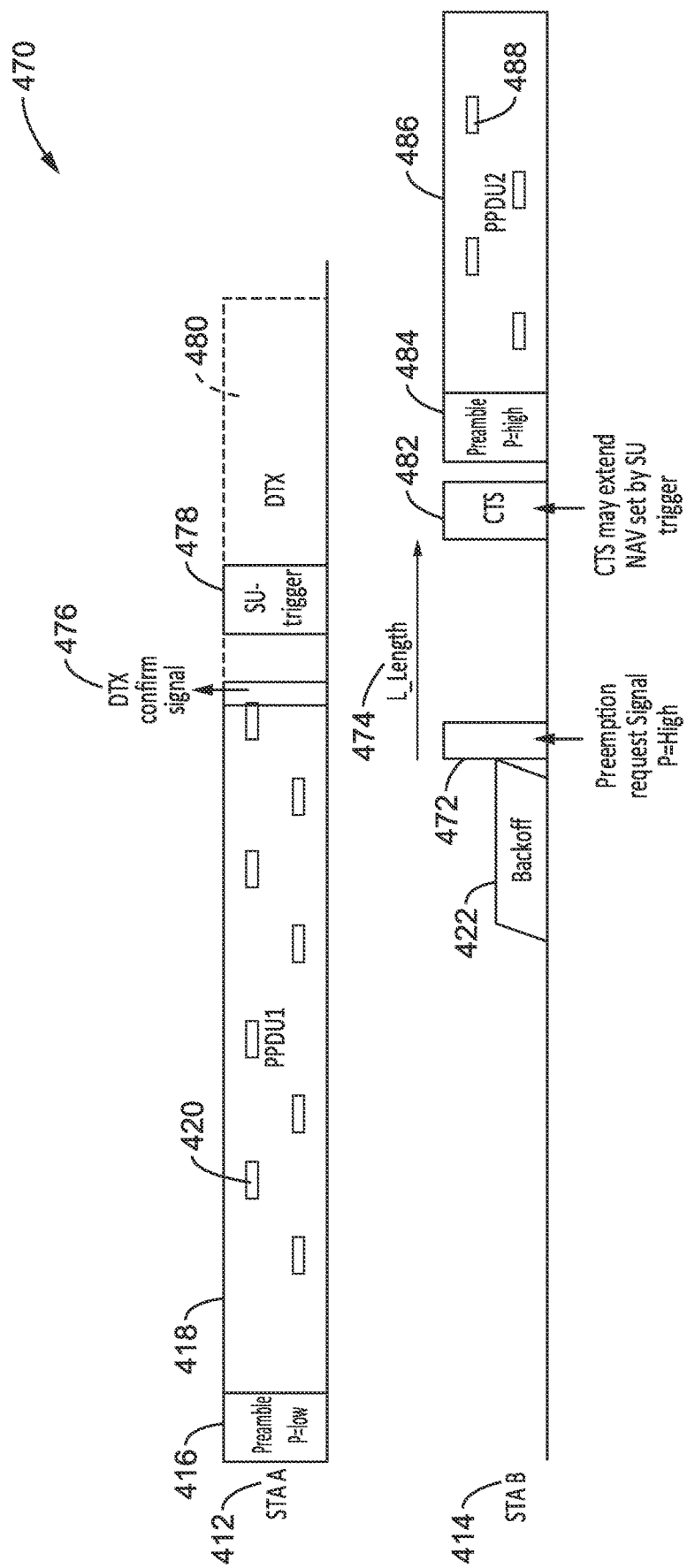
FIG. 21 is a communication diagram of a third example of preemption and/or interruption of FD transmission according to at least one embodiment of the present disclosure.

FIG. 21 illustrates an example embodiment 470 of preemption and/or interruption of FD transmission when the preempted STA is transmitting only. The preempting STA B sends a preemption request signal to launch a preemption transmission. The preemption request also reserves a short period of TXOP time so that other STAs will not access the channel until the expected time of STA A triggering the preemption transmission. The preempted STA A interrupts its ongoing transmission and triggers the preemption transmission.

STA A 412 is the preempted STA and is transmitting PPDU1 418 preceded by preamble 416, which contains an indication of the PPDU being of a low priority. PPDU1 embeds punctured resources 420. STA B 414 is the preempting STA. STA B contends for the channel by sensing channel status during the punctured resource of PPDU1. For example, STA B counts down the backoff 422 when it senses that the channel is idle during the punctured resource 420 of PPDU1, and otherwise pauses the backoff when it senses that the channel is busy. In at least one embodiment/mode/option, STA B pauses its backoff when STA A is transmitting PPDU1 with a higher priority than PPDU2.

When backoff 422 is counted down to zero, STA B can access the channel and sends a signal 472 to request a preemption transmission. It should be noted that when STA B accesses the channel, it may wait several micro-seconds to align its OFDM symbol boundary with that of STA A.

As shown in the example STA B sends this preemption request signal 472 on the whole channel to STA A. The preemption request signal can include an indication of priority for the preemption transmission, e.g., PPDU2 486. The preemption request signal can reserve a period of the TXOP, such as seen by L_length 474 in the figure to prevent other stations from interfering while it awaits a response on its preemption request.

When STA A receives the preemption request signal, it decides to accept the request and pauses transmission of PPDU1 418, and it sends a DTX confirm signal 476. The DTX portion 480 of PPDU1 is that part of PPDU1 that is not transmitted due to the interruption. It will be noted that it is STA A that decides when to interrupt its ongoing PPDU, i.e., PPDU1 within L_length time.

As shown in the figure, the L_length 474 can be set to the time that STA B expects to receive an SU-trigger frame 478 from STA A or the expected time that will sends a CTS frame 482.

If STA A interrupts its ongoing transmission and sends a frame (e.g., SU-trigger frame 478) to launch the preemption transmission within L_length time, STA B can commence its preemptive transmission, e.g., PPDU2 486, preceded by preamble 484, which in this case indicates its priority as higher than that of PPDU1. The format of SU-trigger can be the same as MU-RTS TXS trigger frame 482 as defined in IEEE 802.11be. Then, after receiving SU trigger 478, STA B sends a CTS frame 482 back to STA A, and commences its own preemptive transmission, depicted as preamble 484 and PPDU2 486; which itself may have a punctured resource(s) 488. In at least one embodiment/mode/option the SU-trigger frame only allows a given duration during which the PPDU2 transmission must be completed, or it allows CTS to extend beyond the NAV of the SU trigger. In at least one embodiment/mode/option STA B does not send a CTS frame, but instead starts transmitting PPDU2 immediately after receiving SU-trigger frame from STA A.

It should be noted that it is optional to have punctured resource in PPDU2.

5.4.1.4. Example 4 of Preemption/Interruption

Figure 22:
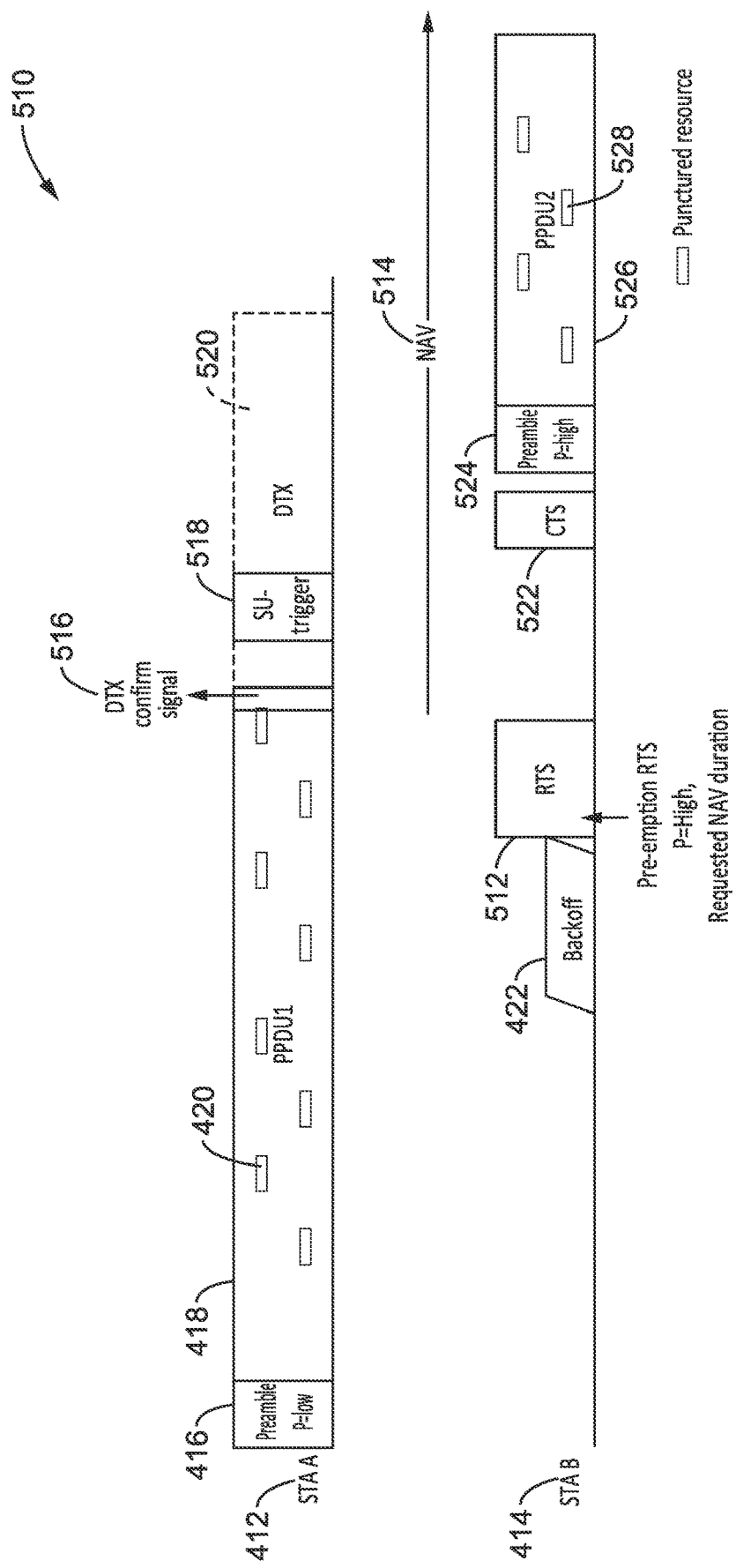
FIG. 22 is a communication diagram of a fourth example of preemption and/or interruption of FD transmission according to at least one embodiment of the present disclosure.

FIG. 22 illustrates an example embodiment 510 of preemption and/or interruption of FD transmission when the preempted STA is transmitting only. Compared with the previous example, the preempting STA sends a RTS frame to request preemption and to reserve a TXOP time for the preemption transmission, otherwise the stations and initial operations are the same.

STA A 412 is the preempted STA and is transmitting PPDU1 418 with its preamble 416 which contains information that PPDU1 is a low priority (lower than PPDU2 in the example). PPDU1 is seen with embedded punctured resources 420. STA B 414 is the preempting STA, which can contend for the channel by sensing channel status during the punctured resource of PPDU1. For example, STA B counts down the backoff 422 when it senses channel idle during the punctured resource of PPDU1 and pauses its backoff when it senses that the channel is busy. In at least one embodiment/mode/option STA B pauses backoff when STA A is transmitting PPDU1 with a higher priority than PPDU2.

When the backoff is counted down to zero, then STA B can access the channel and sends a signal 512 to request a preemption transmission. It will be noted that when STA B accesses the channel, it may wait several micro-seconds to align its OFDM symbol boundary with that of STA A. As shown in the figure, the signal sent to request a preemption transmission by STA B is a RTS frame (denoted as a preemption RTS frame) as a preemption request signal is sent through the whole channel to STA A. The preemption RTS frame can indicate the priority of the preemption transmission, such as PPDU2. The preemption RTS frame can also reserve the TXOP or set NAV 514 for the preemption transmission.

When STA A receives the preemption RTS frame, it decides whether it will accept the request. The prospectively preempted STA, exemplified as STA A, makes the decision on when it will interrupt its ongoing PPDU, shown as PPDU1.

In this example STA A accepts the preemption request, and immediately interrupts PPDU1 transmission. The DTX portion 520 of PPDU1 is that part of PPDU1 that is not transmitted due the interruption. Then STA A sends a DTX confirmation signal 516 indicating interruption of its ongoing transmission. Then STA A sends a frame 518, shown as a trigger frame by way of example and not limitation as a Single-User (SU) trigger frame, to launch the preemption transmission. The format of SU-trigger can be the same as MU-RTS TXS trigger frame as defined in IEEE 802.11be. Then, STA B sends a CTS frame 522 back to STA A and starts its preemption transmission, depicted as preamble 524 and PPDU2 526. Preamble 524 in this example contains priority information, such as the priority of PPDU2 being higher than that of PPDU1. PPDU2 may also contain a punctured resource(s) 528.

Compared with the approaches in the previous example, an RTS can set its NAV 514 for the preemption transmission, e.g., PPDU2 transmission as shown in the figure. If the preemption transmission does not launch successfully (e.g., STA A does not interrupt its PPDU1 transmission, or STA B does not send s CTS frame), any third party STA can cancel the NAV set by the RTS frame. An RTS frame may also add a packet extension field or padding signal to the time it expects to receive the SU trigger frame.

5.4.1.5. Example 5 of Preemption/Interruption

Figure 23:
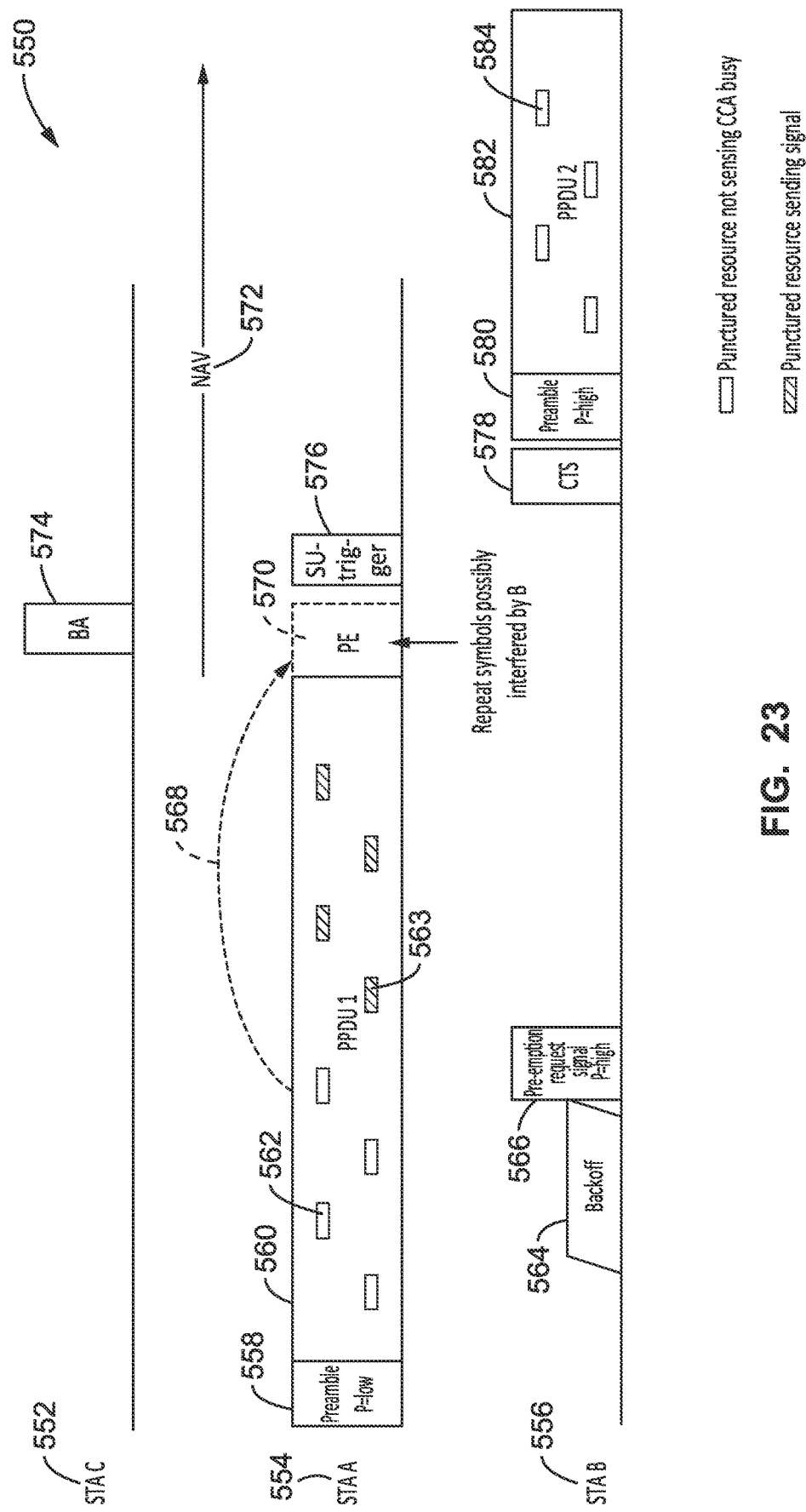
FIG. 23 is a communication diagram of a fifth example of preemption and/or interruption of FD transmission according to at least one embodiment of the present disclosure.

FIG. 23 illustrates an example embodiment 550 of preemption and/or interruption of FD transmission when the preempted STA is only transmitting. This example has included a third station in the communication example, and the preempted STA uses the punctured resource of its ongoing PPDU transmission to indicate the result of the preemption request and to occupy the channel so that other STAs will not send another preemption request. Also, the preempted STA A can repeat symbols possibly interfered by the preemption request in the packet extension (PE) of PPDU1.

STA A 554 is the preempted STA and is transmitting PPDU1 560 with its preamble 558 to STA C 552. PPDU1 embeds punctured resources 562. STA B 556 is the preempting STA, which can contend for the channel by sensing channel status during the punctured resource of PPDU1. For example, STA B counts down the backoff 564 when it senses channel idle during the punctured resource of PPDU1 and pauses the backoff when it senses that the channel is busy. In at least one embodiment/mode/option STA B pauses backoff when STA A is transmitting PPDU1 with a higher priority than PPDU2. When the backoff is counted down to zero, STA B can access the channel and send a signal 566 to request a preemption transmission. It should be noted that when STA B accesses the channel, it may wait several micro-seconds to align its OFDM symbol boundary with that of STA A.

As shown in the figure, STA B sends a preemption request signal 566 to STA A. The preemption request signal can also indicate the priority of the preemption transmission, depicted as PPDU2 582.

When STA A receives preemption request signal 566, it decides on whether to accept the request. In this example STA A accepts the request. In at least one embodiment/mode/option STA A starts transmitting signals and/or noise during the punctured resource (punctured resource sending) 568 in PPDU1. Then, STA B and other STAs, such as STA C can sense CCA busy during the punctured resource of PPDU1. Meanwhile, they can recognize that a third party transmission is ongoing or scheduled.

In at least one embodiment/mode/option STA A transmits an acknowledgement (Ack) to STA B which indicates the preemption request is accepted or rejected by STA A through the punctured resource of PPDU1 563, which can also be utilized to prevent others STAs from sending requests and inform STA C of the preemption.

STA A may decide to launch the preemption transmission after finishing its ongoing PPDU, i.e., PPDU1 560. At the end of PPDU1, STA A can add a packet extension (PE) 570. NAV period 572 commences at the start of the PE time period. The PE can repeat the symbols that were possibly interfered with by STA B (i.e., the symbols of PPDU1 that are transmitted during the transmission time of the preemption request signal of STA B). STA C can also send a BA 574 to STA A during this PE time 570.

It should be noted that the repeated symbol may have to occur before the BA transmission. Then, STA A stops its transmissions and sends a signal 576 to launch the preemption transmission of STA B. By way of example, this signal is represented here as a SU trigger frame whose format can be the same as MU-RTS TXS trigger frame as defined in IEEE 802.11be to STA B. Then, STA B sends a CTS frame 578 back to STA A and starts the preemption transmission, shown as PPDU2 582, preceded by preamble 580, as shown in the figure. It should be noted that PPDU2 may also have a punctured resource(s) 584. In at least one embodiment/mode/option the SU trigger is only allowed to trigger the preemption transmission of STA B within the NAV time obtained by STA A.

5.4.1.6. Example 6 of Preemption/Interruption

FIG. 24 illustrates an example embodiment 590 of preemption and/or interruption of FD transmission when the preempted STA is performing a FD transmission. In this example, the preempting STA B sends a preemption request signal with padding over a preemption signaling RU to reserve a short period of the TXOP. STA A responds to the preemption request within the TXOP time which is reserved by the preemption request. If STA B recognizes that its preemption request is accepted, then it sends another preamble, or a Null Data Packet (NDP), to occupy the preemption signaling RU to prevent other STAs from sending a preemption request signal until the start of the preemption transmission.

STA A 554 is the preempted STA and is seen transmitting a preamble 558, followed by known signal 594, then PPDU1 596 having punctured resources 598; and receives PPDU2 602 with preamble 592 from STA C 552. PPDU2 is transmitted over some RUs of the channel and while leaving one or more RUs 604 for preemption signaling.

STA B 556 is the preempting STA which contends for the channel by sensing the channel status during the punctured resource of PPDU1, which is shown as sensing CCA busy at certain times 600, and not sensing CCA busy 598 at other times. For example, STA B counts down the backoff 606 when it senses the channel is idle 598 over the punctured resource of PPDU1 that is located on the preemption signaling RU, and it pauses the backoff when it senses channel busy 600. When the backoff 606 is counted down to zero, STA B can access the channel and sends a signal 608 to request a preemption transmission. It should be noted that when STA B accesses the channel, it may wait several micro-seconds to align its OFDM symbol boundary with that of STA A.

As shown in the figure, STA B sends preamble1 608 followed by a preemption request signal 610 and padding 612 to STA A. By way of example Preamble 1 may consist of a legacy preamble, for example a non-HT, HT, VHT, HE, EHT preamble, as defined in IEEE 802.11be. The preemption request signal is transmitted over preemption signaling RU that is not being used to transmit PPDU2. The preemption request signal can include an indication of the priority of the preemption transmission, e.g., PPDU3 632. Due to the preemption signal and padding over the preemption signaling RU, the other nodes will sense the punctured resources and will not be sending signals which may interfere.

When STA A receives the preemption request signal, it decides on whether to accept the request. In this example STA A accepts the request. In at least one embodiment/mode/option STA A commences transmitting signals 614 during the punctured resource, as a punctured resource sending signal, in PPDU1. When STA A sends a signal during the punctured resource of PPDU1, it can send a signal to STA B to indicate the acceptance of the preemption request. For example, STA A can also send an Ack signal 615 to inform STA B that its preemption request is accepted over the punctured resource. The Ack may be transmitted by PSK/QAM signals containing coded information with a Cyclic Redundancy Check (CRC) and can be equalized (using LTF of STA A) and decoded for the CRC check. The CRC check distinguishes the Ack from a third party interference. The format of the Ack can be the same as it is defined in IEEE 802.11 which contains the MAC address of STA B, which can then send another preamble2 616 with padding 618 to occupy the channel until the start of the preemption transmission. Due to the padding over the preemption signaling RU, the other nodes will sense the punctured resources over the punctured resource that are located at preemption signaling RU and not transmit signaling.

At the end of PPDU1 and PPDU2, STA A and STA C can exchange BA 620 and 626 to report the packet loss for the part of PPDU1 and PPDU2 that have been transmitted. It will be noted that a NAV starts 622 at this time. Then, STA A does not start transmitting another PPDU, but sends a signal 626 to launch the preemption transmission of STA B. By way of example, and not limitation, the signal exemplified here is a SU trigger frame whose format can be the same as the MU-RTS TXS trigger frame as defined in IEEE 802.11be as sent here from STA A to STA B.

Then, STA B responds back 628, exemplified as a CTS frame, back to STA A and starts the preemption transmission, in which preamble 630 and PPDU2 632 is shown being communicated. It should be noted that PPDU2 and/or PPDU3 may have punctured resource(s) 634.

In at least one embodiment/mode/option the SU trigger is only allowed to trigger the preemption transmission of STA B within the NAV time obtained by STA A.

It should be noted that preamble1 608 of STA B may only be allowed to reserve a limited TXOP time, set limited NAV, or hold a limited CCA busy time or pad time. For example, in at least one embodiment/mode/option, those times should not exceed the expected receiving time of Ack from STA A.

5.4.1.7. Example 7 of Preemption/Interruption

Figure 25:
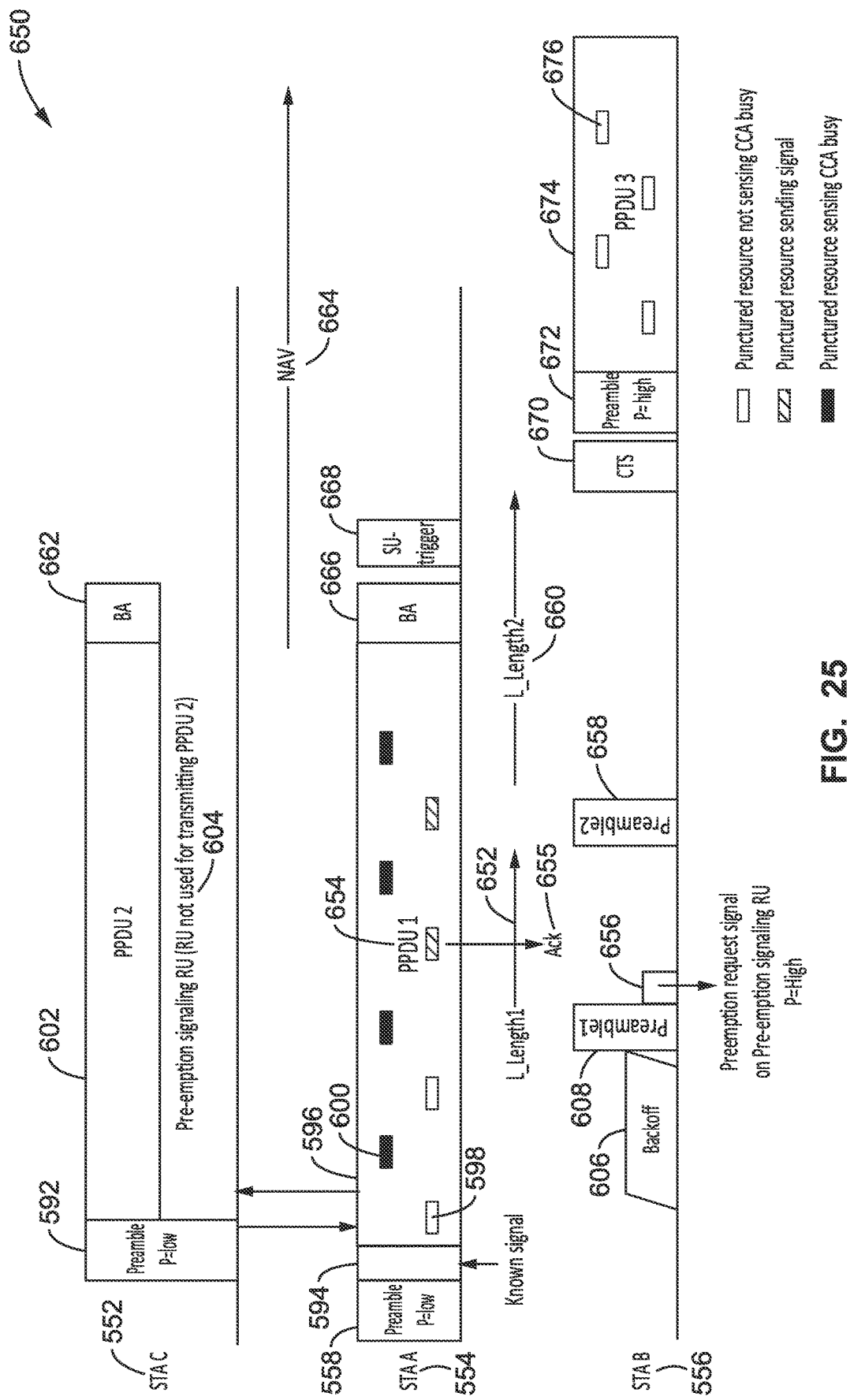
FIG. 25 is a communication diagram of a seventh example of preemption and/or interruption of FD transmission according to at least one embodiment of the present disclosure.

FIG. 25 illustrates an example embodiment 650 of preemption and/or interruption of FD transmission when the preempted STA is performing FD transmission. Compared with the previous example, this diagram shows that preamble1 and preamble2 can reserve a portion of the TXOP instead of sending a padding signal. STA A is the preempted STA and is transmitting PPDU1 to STA C, and receiving PPDU2 from STA C. PPDU1 embeds punctured resources. PPDU2 is not transmitted over an RU (i.e., preemption signaling RU as shown in the figure).

By way of example and not limitation, three stations are again shown interacting in the figure: STA C 552, STA A 554 and STA B 556. The first portion of the figure is the same as in FIG. 24 up to the following point.

STA B 556 is the preempting STA, which can contend for the channel by sensing channel status during the punctured resource of PPDU1. For example, STA B counts down the backoff 606 when it senses channel idle 598 over the punctured resource of PPDU1 that are located on the preemption signaling RU, and pauses the backoff when it senses channel busy 600. When the backoff is counted down to zero, STA B can access the channel and send a signal to request a preemption transmission. It should be noted that when STA B accesses the channel, it may wait several micro-seconds to align its OFDM symbol boundary with STA A's.

As shown in the figure, STA B sends preamble1 608 followed by a preemption request signal 656 to STA A. Preamble1 can be the same as, but is not limited to, the legacy preamble (such as non-HT, HT, VHT, HE, EHT preamble) as defined in IEEE 802.11be. The preemption request signal is transmitted over preemption signaling RU that is not used to transmit PPDU2. The preemption request signal can include an indication of priority of the preemption transmission, which is depicted as PPDU3. The preemption request reserves a TXOP time, with L_length1 652, to wait for the Ack 655 from a punctured resource sending signal 654 from STA A.

When STA A receives the preemption request signal, decides on whether to accept the request. It is possible that STA A starts to transmit signals and/or noise during the punctured resource (punctured resource sending signal) in PPDU1.

Then, the other STAs can sense that the channel is busy during those punctured resources and not access the channel. When STA A sends a signal during the puncture resource of PPDU1, it can send a signal to STA B to indicate the acceptance of the preemption request. For example, STA A is exemplified here as sending an Ack 655 signal to inform STA B that its preemption request is accepted over the punctured resource. The Ack may be transmitted by PSK/QAM signals containing coded information with CRC and can be equalized (using STA A's LTF) and decoded for CRC check. The CRC check distinguishes this Ack from third party interference. The format of the Ack can be the same as it is defined in IEEE 802.11 which contains the MAC address of STA B. STA B can then send another preamble2 658 to reserve TXOP, for L_length2 660, until the start of the preemption transmission.

At the end of PPDU1 and PPDU2, STA A and STA C can exchange BA 662 and 666, to report packet loss for these portions of PPDU1 and PPDU2 that have been transmitted. A NAV 664 is shown starting at the start of these BAs. Then, STA A stops transmitting another PPDU and sends a signal 668 to launch the preemption transmission of STA B. By way of example, STA A sends a SU trigger frame 668 whose format can be the same as MU-RTS TXS trigger frame as defined in IEEE 802.11be to STA B. In response to this, STA B sends a CTS frame 670 back to STA A and starts the preemption transmission, depicted with preamble 672 and PPDU3 674.

It should be noted that both PPDU2 and PPDU3 may also include punctured resources. In at least one embodiment/mode/option PPDU3 can be used to launch a full duplex transmission between STA A and STA B if PPDU3 is transmitted to STA A; in which case the format of PPDU3 should be the same as PPDU1.

It should be noted that the L_length1 652 should cover a time span of at least one punctured resource of PPDU1 so that STA A can use the punctured resource to send an Ack for the preemption request frame. The L_length1 should not exceed the end time of PPDU1 (maybe including the BA time).

It is possible that the SU trigger is only allowed to trigger the preemption transmission of STA B within the NAV time obtained by STA A.

5.4.1.8. Example 8 of Preemption/Interruption

Figure 26:
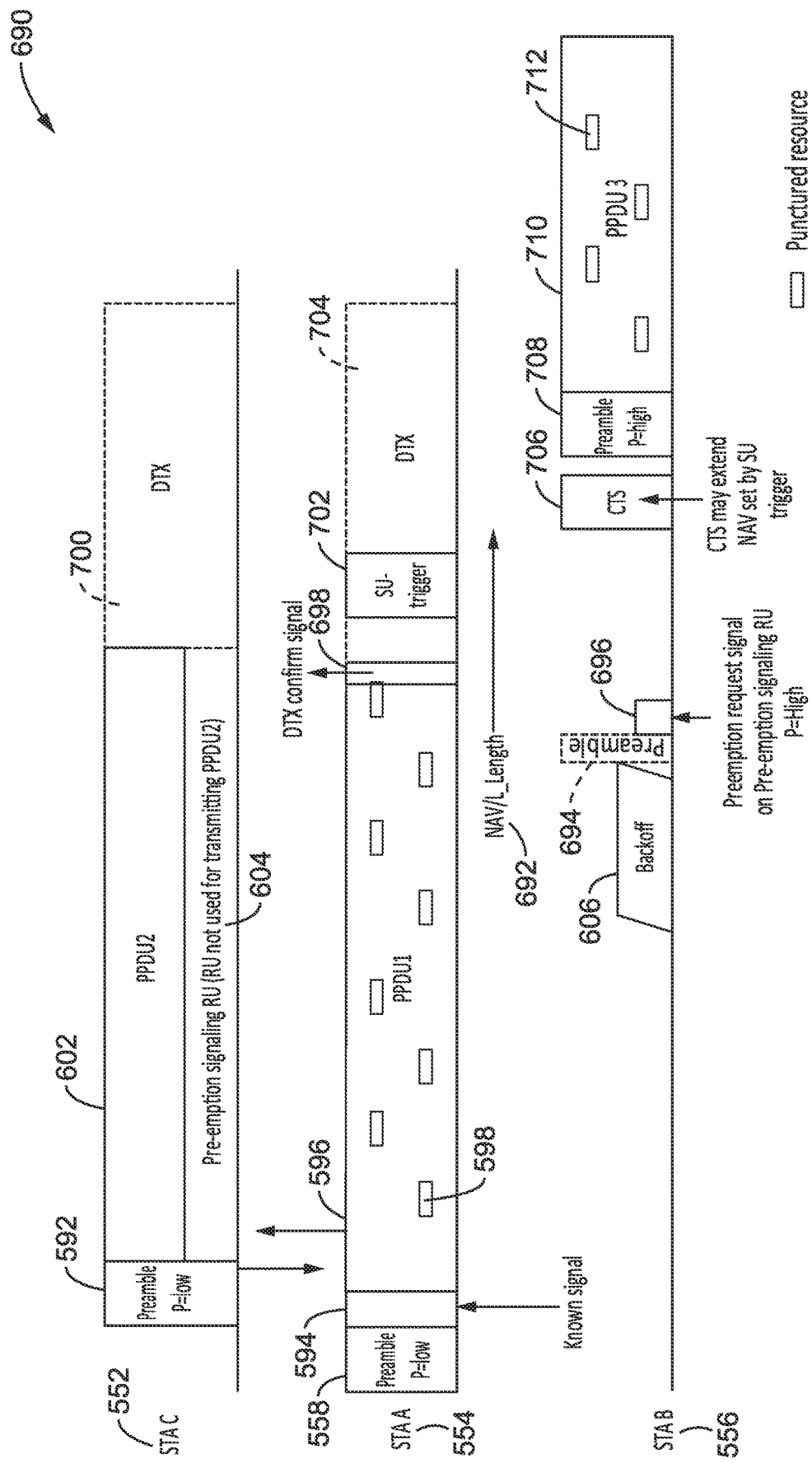
FIG. 26 is a communication diagram of an eighth example of preemption and/or interruption of FD transmission according to at least one embodiment of the present disclosure.

FIG. 26 illustrates an example embodiment 690 of preemption and/or interruption of FD transmission when the preempted STA is performing an FD transmission. Compared with the previous example, this example illustrates that STA B only sends one preemption request signal to reserve a period of the TXOP to wait for the start of the preemption transmission (PPDU3).

The beginning portions of the figure are the same as described in the previous figures, as noted by the like reference numbering. STA A 554 is the preempted STA and is transmitting PPDU1 596 to STA C 552, and is receiving PPDU2 from STA C. PPDU1 embeds punctured resources 598.

PPDU2 602 is not transmitted over one or more RUs 604 that are utilized for preemption signaling. STA B 556 is the preempting STA. STA B can contend for the channel by sensing channel status during the punctured resource 598 of PPDU1 596. For example, STA B counts down the backoff 606 when it senses channel idle over the punctured resource of PPDU1 that are located on the preemption signaling RU, and pauses the backoff when it senses that the channel is busy. When the backoff is counted down to zero, STA B can access the channel and sends an optional signal 694 to request a preemption transmission. It should be noted that when STA B accesses the channel, it may wait several micro-seconds to align its OFDM symbol boundary with that of STA A.

As shown in the figure, STA B sends a preemption request signal 696 to STA A. The preamble of the preemption request can be the same, but is not limited to, that of a legacy preamble (such as non-HT, HT, VHT, HE, EHT preamble) as defined in IEEE 802.11be and be transmitted over the whole channel. The preemption request signal is transmitted over preemption signaling RU. The preemption request signal can include an indication of the priority of the preemption transmission, exemplified as PPDU3 710. The preamble 694 of the preemption request can also reserve a period of TXOP time, such as L_length time 692 or set the NAV.

When STA A receives the preemption request signal, it determines whether to accept the request. In this example, STA A accepts the request and interrupts its ongoing transmission within L_length time 692, and sends a DTX confirmation signal 698. In view of the transmission of the DTX confirming signal 698, the receiver of PPDU1 (e.g., STA A) recognizes the interruption of PPDU1, and STA C 552 interrupts its own ongoing transmission of PPDU2 602 at the same time.

In accepting the preemption request, STA A decides when to interrupt its ongoing PPDU, i.e., PPDU1 596. For example, STA A may decide to interrupt the PPDU when finishing the current MPDU transmission.

STA A is shown interrupting its ongoing transmission and sending a signal 702, exemplified as an SU trigger frame, within L_length time 692; which allows STA B to launch its preemption transmission depicted as PPDU3 710.

So, in this case, STA A has ended PPDU1 596 transmission by sending a DTX confirm signal 698. According to a DTX confirming signal, both the receiver of PPDU1 and STA B can recognize the interruption of PPDU1. It will be noted that the DTX portion 704 of PPDU1 and DTX portion 700 of PPDU2 are the portions of PPDU1 and PPDU2 that are not transmitted due to interruption. Upon receiving signal 702 (e.g., SU-Trigger), STA B responds with a CTS 706, which can be set to extend the NAV set by the SU Trigger. After this STA B transmits preamble 708, optionally containing priority information, followed by its PPDU depicted as PPDU3 710, which may include punctured resource(s) 712.

It should also be noted that PPDU2 and PPDU3 may have optional punctured resource(s). In at least one embodiment/mode/option PPDU3 can be used to launch a full duplex transmission between STA A and STA B if PPDU3 is transmitted to STA A; in which case the format of PPDU3 should be the same as PPDU1.

5.4.1.9. Example 9 of Preemption/Interruption

Figure 27:
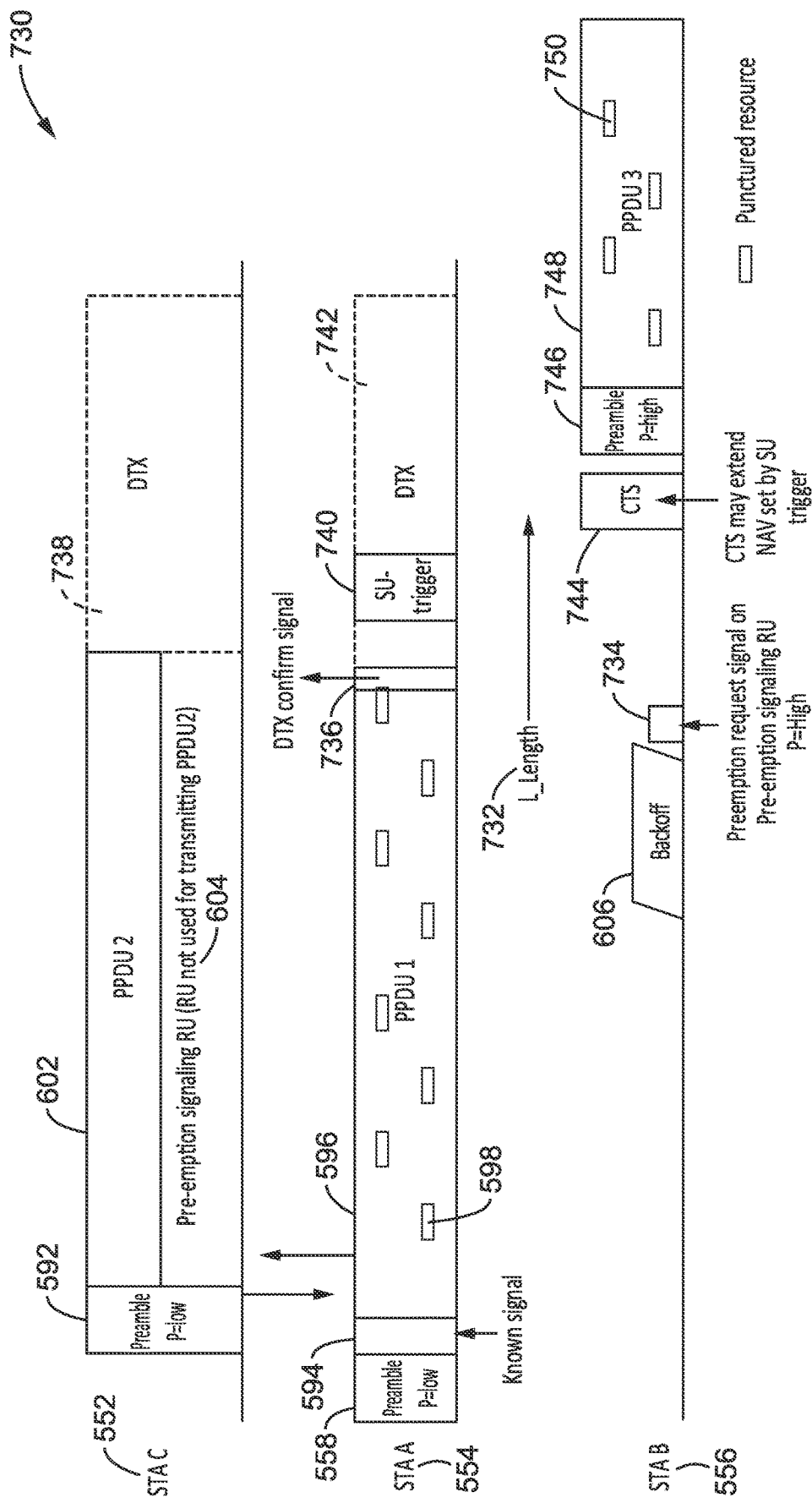
FIG. 27 is a communication diagram of a ninth example of preemption and/or interruption of FD transmission according to at least one embodiment of the present disclosure.

FIG. 27 illustrates an example embodiment 730 of preemption and/or interruption of FD transmission when the preempted STA is performing FD transmission. Compared with the previous example, this figure shows that the preemption request signal can be transmitted using only RU preemption signaling. The first portion of this figure is same as described in FIG. 26.

STA A 554 is the preempted STA and is transmitting PPDU1 596, preceded by preamble 558 and known signal 594, to STA C 552; and STA A is receiving PPDU2 602 from STA C 552. PPDU1 has embedded punctured resources 598. PPDU2 602 is not transmitted over all the RUs, as RU 604 is shown reserved for preemption signaling.

STA B 556 is the preempting STA, which can contend for the channel by sensing channel status during the punctured resource 598 of PPDU1 596. For example, STA B counts down the backoff 606 when it senses that the channel is idle over the punctured resource 598 of PPDU1 596 located on the preemption signaling RU, and pauses the backoff when it senses channel busy. When the backoff is counted down to zero, STA B can access the channel and sends a signal 734 to request a preemption transmission. It will be noted that when STA B accesses the channel, it may wait several micro-seconds to align its OFDM symbol boundary with that of STA A.

In this example, the preamble of the preemption request and the preemption request signal are transmitted over preemption signaling RU 734. The preemption request signal can include a priority indicator for the preemption transmission, for example for PPDU3 748. The preamble of the preemption request can also reserve a period of TXOP time, such as L_length 732.

When STA A receives the preemption request signal it decides on whether or not to accept it. In this example STA A is considered to accept the request, and STA A interrupts its ongoing transmission 596 within L_length time 732, and ends its PPDU1 transmission by sending a DTX confirmation signal 736.

In view of the use of the DTX confirming signal, STA C, which is the receiver of PPDU1, recognizes the interruption of PPDU1 and interrupts its own ongoing transmission of PPDU2 602 at the same time. It will be noted that the DTX portion of PPDU1 742 and the DTX portion 738 of PPDU2 are parts of PPDU1 and PPDU2 that are not transmitted due to interruption.

STA A may decide when to interrupt its own ongoing PPDU, i.e., PPDU1 596. For example, STA A may decide to interrupt the PPDU when finishing the current MPDU transmission. If STA A interrupts its ongoing transmission and sends a signal, such as an SU trigger frame 740 within L_length time 732, then this allows STA B to launch its preemption transmission.

The figure shows STA B sending a CTS 744, which may also extend the NAV set by the SU Trigger. After this STA B transmits preamble 746, which may include priority information, and then PPDU3 748, which may include its own punctured resource(s) 750.

It should be noted that any of the PPDUs may contain punctured resource. In at least one embodiment/mode/option PPDU3 can be used to launch a full duplex transmission between STA A and STA B if the PPDU3 is transmitted to STA A. Then, the format of PPDU3 should be the same as PPDU1.

5.4.1.10. Example 10 of Preemption/Interruption

Figure 28:
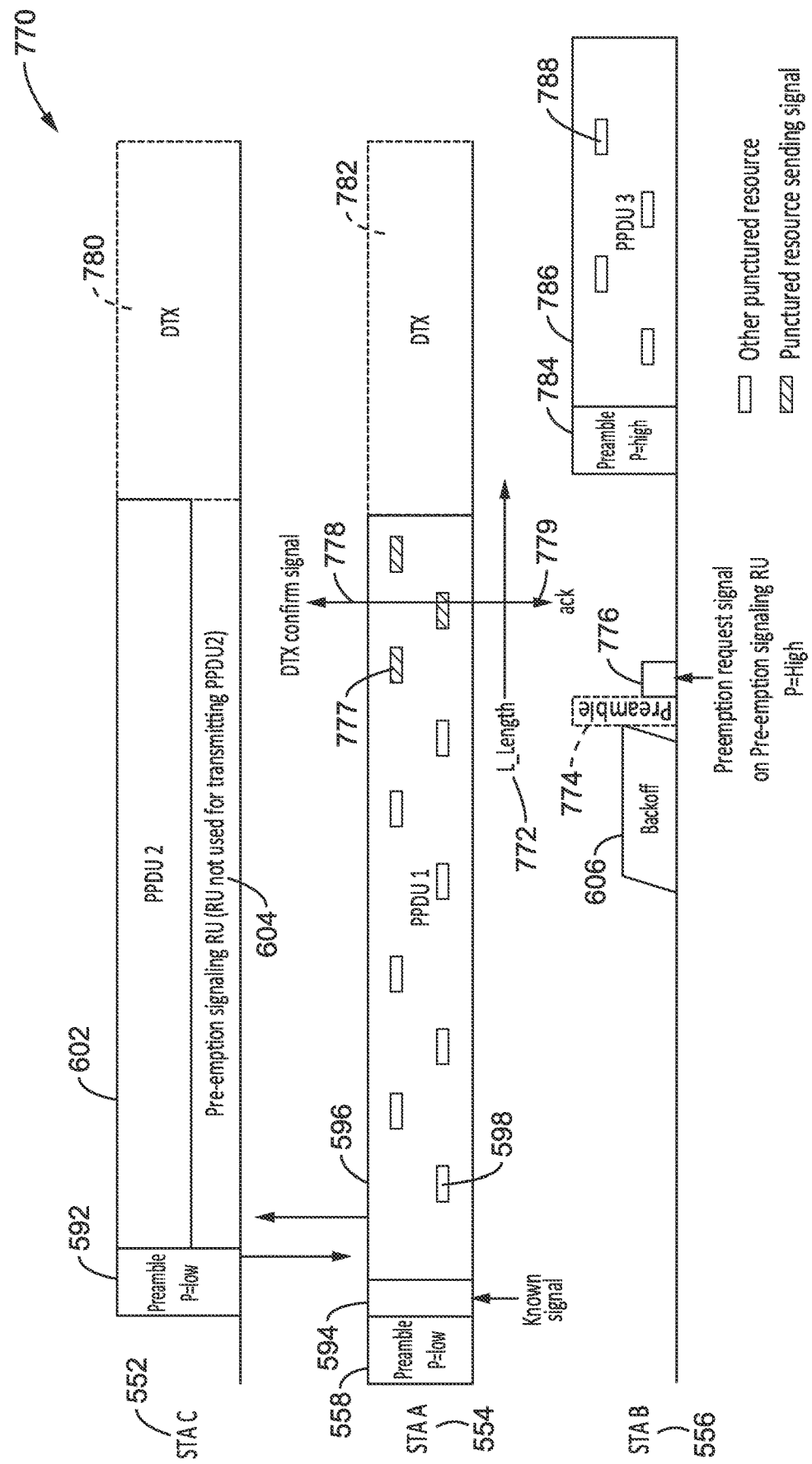
FIG. 28 is a communication diagram of a tenth example of preemption and/or interruption of FD transmission according to at least one embodiment of the present disclosure.

FIG. 28 illustrates an example embodiment 770 of preemption and/or interruption of FD transmission when the preempted STA is performing a FD transmission. Compared with Example 8, this example shows that the preempting STA uses the punctured resource to send acknowledgement (Ack) for the preemption request and the DTX confirmation signal to interrupt the full duplex transmission. After STA A interrupts its FD transmission, STA B starts transmitting PPDU3 immediately after interruption of PPDU1. L_length is independent from PPDU3 length.

The first portion of the figure is the same as seen in the previous figures. STA A 554 is the preempted STA and is transmitting PPDU1 596 to STA C 552; and is receiving PPDU2 602 from STA C. PPDU1 596 contains embedded punctured resources 598. PPDU2 is not transmitted over all the RU, as at least one RU is retained for preemption signaling 604 as shown in the figure.

STA B 556 is the preempting STA and can contend for the channel by sensing channel status during the punctured resource 598 of PPDU1 596. For example, STA B counts down the backoff 606 when it senses that the channel is idle over punctured resource 598 of PPDU1 located on preemption signaling RU, and pauses the backoff when it senses that the channel is busy. STA B can access the channel and send a signal to request a preemption transmission. This signal is shown as a preemption request signal 776 transmitted on the preemption signaling RU 777, and can include a priority value of the preemption transmission, e.g., PPDU3 786. An optional preamble 774 may be sent preceding signal 776. The preamble of the preemption request can be, but is not limited to, the legacy preamble (such as HT, VHT, EHT preamble) as defined in IEEE 802.11be and in this case transmitted over the whole channel.

It will be noted that when STA B accesses the channel, it may wait several micro-seconds to align its OFDM symbol boundary with that of STA A.

When STA A receives the preemption request signal, it decides whether or not to accept the request. In this example, STA 1 accepts the preemption transmission request, interrupts its ongoing transmission within L_length time 772, and sends a DTX confirmation signal 778, and an optional Ack 779, over the punctured resource. STA A may decide when to interrupt its ongoing PPDU, i.e., PPDU1. STA A can send the Ack signal to inform STA B that its preemption request is accepted over the punctured resource.

The Ack may be transmitted for example by PSK/QAM signals containing coded information, such as with CRC and can be equalized (using STA A's LTF) and decoded for the CRC check. The CRC check allows distinguishing the Ack from third party interference. The format of the Ack can be the same, but is not limited to, how it is defined in IEEE 802.11 which contains the MAC address of STA B.

In response to receiving the DTX confirmation signal, the receiver of PPDU1 which is STA C, and the preempting STA of STA B, can both recognize that PPDU1 596 ongoing transmissions have been interrupted, as well as the ongoing transmission of PPDU2 602 having been interrupted. It should be noted that the DTX portion of PPDU1 782, and the DTX portion of PPDU2 780 are the parts of PPDU1 and PPDU2 that are not transmitted due to interruption.

STA B can commence its preemption transmission without the need of a CTS, and it transmits PPDU3 786, preceded by preamble 784 which may include priority information, immediately after interruption of PPDU1.

It should be noted that punctured resources may be optionally included in PPDU2 and/or PPDU3. It at least one embodiment/mode/option PPDU3 can be utilized to launch a full duplex transmission between STA A and STA B if PPDU3 is transmitted to STA A; in which case the format of PPDU3 should be the same as PPDU1.

6. Data Formats

The following data formats are shown by way of example and not limitation. It should be noted that some of these fields can utilize formats previously defined, although they are not limited to those formats.

6.1. FD PPDU Format

FIG. 29 illustrates an example embodiment 810 of a PPDU format that can be used for FD transmission and preemption. When an FD originator or FD recipient, or preempting STA, or preempted STA, starts to transmit a PPDU, it can use the FD PPDU format.

The fields between L-STF and EHT-LTF are the preamble of the PPDU. The fields L-STF, L-LTF, L-SIG, RL-SIG, EHT-STF, and EHT-LTF can be the same as defined in IEEE 802.11be, but are not limited thereto. The fields U-SIG and EHT-SIG can be the same as defined in IEEE 802.11be with the following additional fields.

A FD transmission allowance field is set to a first state (e.g., "1") to indicate the PPDU is transmitted for FD transmission. The receiver STA can thus recognize that there is an ongoing FD transmission, and the transmitter STA of this PPDU is either a FD originator or recipient. Otherwise, this field is set to a second state (e.g., "0").

A FD originator/recipient field is set to indicate the transmitter of this PPDU is either a FD originator or recipient. This field can be reserved when the FD transmission allowance field is set to a second state (e.g., "0"). It is possible that if the transmitter STA is the FD originator and preemption is allowed, then a STA which is not a FD originator or recipient can request a preemption transmission during the PPDU transmission time.

A Time and Frequency of punctured resource field is used for indicating the length, the periodic and the frequency allocation of punctured resource(s) in the PPDU. From this field the receiver STA can obtain information of the punctured resource in the PPDU and sense the channel over the punctured resource to detect any third party transmissions.

A Preemption allowance field is set to a first state (e.g., "1") to indicate that preemption is allowed. The receiver STA can request a preemption during the PPDU transmission time. In at least one embodiment/mode/option the receiver STA request a preemption transmission when its PPDU priority is higher than the priority of the PPDU. Otherwise, it is set to a second state (e.g., "0") and the receiver STA is not allowed to request a preemption during the PPDU transmission time. In at least one embodiment/mode/option this field has to be set to this second state (e.g., "0") if the transmitter STA is a FD recipient. In at least one embodiment/mode/option the transmitter STA sets this field to a second state (e.g., "0") in the FD PPDU when the FD PPDU is transmitted during the spatial reuse transmission or coordinated MAP transmission of the transmitter STA. In at least one embodiment/mode/option the transmitter STA is not allowed to transmit FD PPDU during its spatial reuse transmission or coordinated MAP transmission.

A Priority field indicates the priority of the PPDU. This field can be UP, AC, TID or any other information that can indicate the priority of the PPDU.

An RU as FD indication field is set to indicate the presence of the common Info field and User Info List field. If it is set to a first state (e.g., "1"), the common Info field and User Info List field is present. Otherwise, if it is set to a second state (e.g., "0") and the common Info field and User Info List field are not present.

A Common Information (Info) field can be the same as the common Information field in the basic trigger frame as defined in IEEE 802.11ax. The receiver STA, which is a FD recipient or preempting STA can transmit PPDU following the requirements in the common field as they transmit a TB PPDU in IEEE 802.11ax. The trigger type field in the common info field can be set to Basic or FD trigger to indicate that this field is to trigger transmission of FD recipient. This field may not be needed, or reserved, if FD transmission allowance is set a second state (e.g., "0") or the transmitter STA is the FD recipient. It should be noted that the AP Tx Power subfield in the common info field as defined in IEEE 802.11ax can represent the requested power level for the transmitter STA.

A User Information (Info) List field is set to allocate RU and other transmission information for the FD recipient STA and the preempting STA. Each user info field can be similar to the user info field in the basic trigger frame as defined in IEEE 802.11ax.

A User Information (Info) for the FD recipient field is set to indicate the PPDU transmission requirement of FD recipient STA. The FD recipient STA should follow the requirement indicated in the field to transmit a PPDU for the FD transmission. This field may not be needed, or may be reserved, if a FD transmission allowance is set to a second state (e.g., "0") or the transmitter STA is the FD recipient. It is possible that the multiple User Info for FD recipient fields are carried in the same User Info List.

A User Information (Info) for FD preemption field is set to indicate the PPDU transmission requirement of the preempting STA. The preempting STA should follow the requirement indicated in the field to transmit a preemption signal to the transmitter STA. This field may not be needed, or can be reserved, if preemption allowance is set to a second state (e.g., "0") or the transmitter STA is FD recipient.

6.2. DTX Confirmation Signal Format

Figure 30:
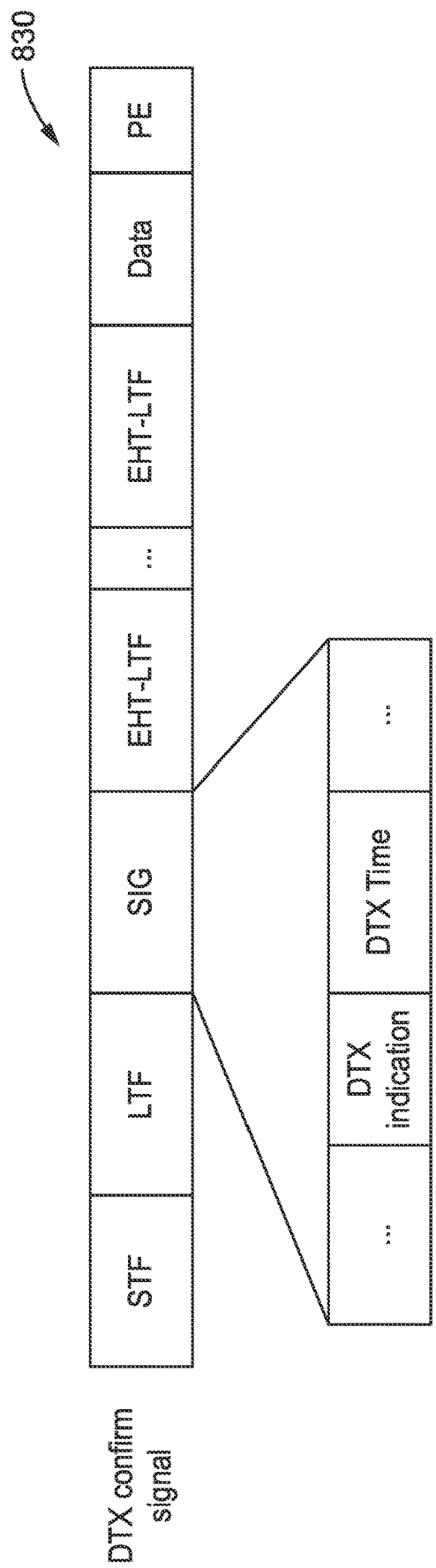
FIG. 30 is a data field diagram of a DTX confirmation signal format according to at least one embodiment of the present disclosure.

FIG. 30 illustrates an example embodiment 830 of a DTX confirmation signal format. This signal can be added in the middle of an ongoing transmission PPDU to indicate the interruption of the PPDU transmission.

A STF field can be the same as L-STF, EHT-STF, or other type of short training field as defined in IEEE 802.11, which can be used for the receiver STA to detect the start of a DTX confirmation signal during receiving.

A LTF field can be the same as L-LTF, EHT-LTF, or other type of long training field as defined in IEEE 802.11, which can be used for the receiver STA to estimate the channel condition.

A SIG field can be the same as U-SIG as defined in IEEE 802.11be to carry the information of the signal.

A DTX indication field is used to indicate the purpose of the signal as being to interrupt the current PPDU. For example, this field can be a one-bit indication. When it is set to a first state (e.g., "1"), it is a DTX confirmation signal for when the current ongoing PPDU is interrupted at DTX time. If the transmitter STA is a FD recipient STA and there is another ongoing transmission by the FD recipient STA, then that FD recipient should interrupt its transmission at the DTX time as well. Otherwise, it is set to a second state (e.g., "0"). This bit can be a reserved bit in a U-SIG field.

A DTX time field indicates the time that the transmitter STA and the FD recipient STA interrupt their ongoing transmissions. This field can also be set to the number of OFDM symbols. For example, if this field is set to "n" OFDM symbols, the transmitter STA and the FD recipient STA interrupt their ongoing transmissions after transmitting "n" number of OFDM symbols. In certain instances, this field is not required. If there is no DTX time field, then the transmitter STA and the FD recipient STA should interrupt their ongoing transmissions immediately after they receive the DTX confirmation signal.

An EHT-LTF field can be identical to that is defined in IEEE 802.11be. This field can provide time to the transmitter STA to detect the interruption of the transmitting of the FD recipient STA. If there is no FD recipient STA, this field may not be required. If the transmitter STA does not detect the interruption of the transmitting of the FD recipient STA, it can retransmit the DTX confirmation signal.

A Data field can be used to carry additional information, such as BAR, to request the BA from the receiver STA of the ongoing PPDU. When the STA receives this BAR, it should send a BA immediately.

A PE field is a packet extension field used for the transmitter STA to receive feedback that is carried by the data field.

6.3. Preemption Request Signal Format

Figure 31:
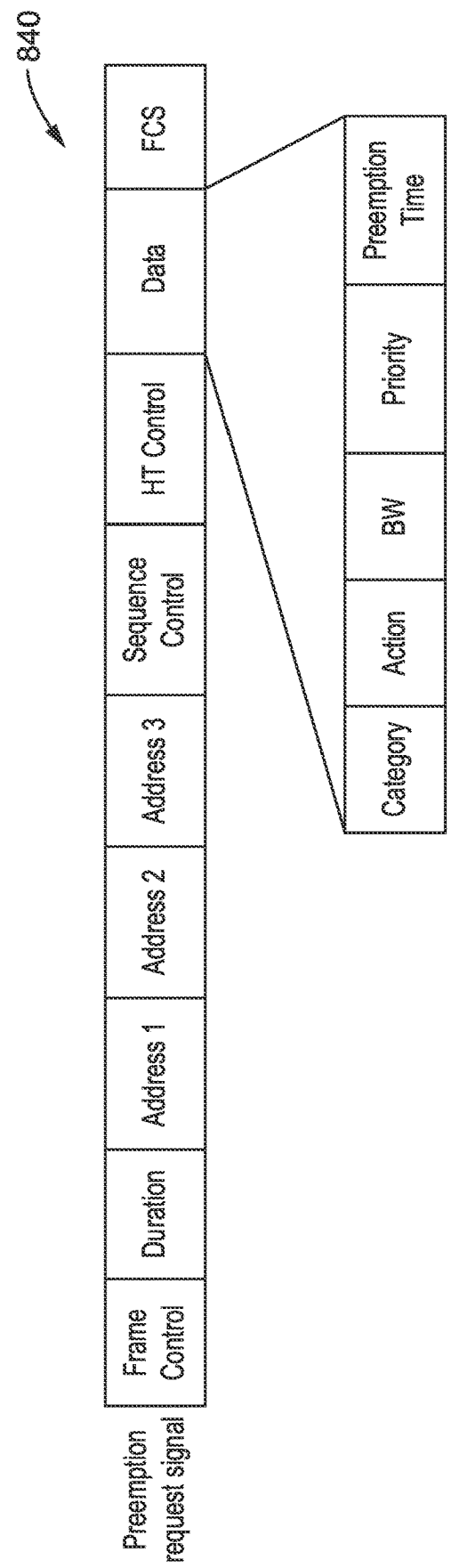
FIG. 31 is a data field diagram of a preemption request signal format according to at least one embodiment of the present disclosure.

FIG. 31 illustrates an example embodiment 840 of a preemption request signal format. The frame control field indicates the type of frame. A Duration field contains duration of the signal. An Address 1 field contains an address for the recipient of the frame. An Address 2 field contains the address of the transmitter of the frame. Address 3 contains the BSS ID of the transmitter of the frame. A Sequence control field contains the fragment number and the sequence number of the packet.

A HT Control field can be identical to IEEE 802.11ax to provide additional information of the preempting STA. For example, this field can carry BSR. The preempted STA receiving this field can estimate the channel resources that the preempting STA needs for transmitting the buffer reported by BSR. Then, the preempted STA can decide whether to accept or reject the preemption request.

A Data field carries the information of the preemption request.

A Category and Action field indicate the frame is a preemption request signal. If the preempted STA accepts the request, it interrupts its ongoing transmission and launches the preemption transmission of the preempting STA. When the preempted STA accepts the request, it can send an Ack to respond to the preempting STA. It should be noted that the ostensibly preempted STA can decide to reject the request and not respond.

A BW field indicates the bandwidth that the preempting STA requests to transmit in the preemption transmission. The BW value should be larger than that which was used by the ongoing transmission of the preempted STA. The preempted STA can decide whether to accept or reject the request based on this information.

A Priority field indicates the priority of the preemption transmission that is requested by the preempting STA. If the priority of the preemption transmission is higher than the ongoing transmission of the preempted STA, the preempted STA may accept the request. If the preempted STA is also a FD originator, it may accept the request if the priority of the preemption transmission is higher than the priorities of the ongoing transmission of both the FD originator and recipient STAs.

A Preemption Time field indicates the time that the preempting STA needs to transmit its preemption transmission. The preemption time may not be longer than the remaining time of the ongoing PPDU of the preempted STA, or the remaining TXOP duration as obtained by the preempted STA. Otherwise, the preempted STA may reject the preemption request.

7. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a station (STA), wirelessly communicating with other STAs on a wireless local area network (WLAN) in an IEEE 802.11 protocol configured for supporting carrier sense multiple access/collision avoidance (CSMA/CA); (b) a processor coupled to said STA; (c) a non-transitory memory storing instructions executable by the processor for communicating with other STAs and fulfilling different roles of a communications protocol; and (d) wherein said instructions, when executed by the processor, perform one or more steps comprising: (d)(i) performing ongoing physical layer protocol data unit (PPDU) transmissions by said station, which has full duplex (FD) capability; (d)(ii) receiving at said STA, while said STA is performing said ongoing transmissions, a preemption request by another STA; (d)(iii) determining from information in the preemption request whether or not to accept the preemption request; and (d)(iv) interrupting ongoing transmissions by said STA which is now operating as a preempted STA when it accepts the preemption request from the other STA operating as a preempting STA, and thus the preempted STA allows the preempting STA to use the channel.

An apparatus for wireless communication in a network, the apparatus comprising: (a) a wireless communication circuit, as a station (STA), wirelessly communicating with other STAs on a wireless local area network (WLAN) in an IEEE 802.11 protocol configured for supporting carrier sense multiple access/collision avoidance (CSMA/CA); (b) a processor coupled to said STA; (c) a non-transitory memory storing instructions executable by the processor for communicating with other STAs and fulfilling different roles of a communications protocol; and (d) wherein said instructions, when executed by the processor, perform one or more steps comprising: (d)(i) performing ongoing physical layer protocol data unit (PPDU) transmissions by said station, which has full duplex (FD) capability; (d)(ii) wherein the preempted STA has a punctured resource in its PPDU which can be utilized by the preempting STA for detecting third party transmissions; (d)(iii) receiving at said STA, while said STA is performing said ongoing transmissions, a preemption request by another STA; (d)(iv) determining from information in the preemption request whether or not to accept the preemption request; and (d)(v) interrupting ongoing transmissions by said STA which is now operating as a preempted STA when it accepts the preemption request from the other STA operating as a preempting STA, and thus the preempted STA allows the preempting STA to use the channel.

A method for performing wireless communication in a network, the apparatus comprising: (a) a station (STA) wirelessly communicating with other STAs on a wireless local area network (WLAN) in an IEEE 802.11 protocol configured to allow different STAs to perform different roles during the communications which support carrier sense multiple access/collision avoidance (CSMA/CA); (b) performing ongoing physical layer protocol data unit (PPDU) transmissions by said station, which has full duplex (FD) capability; (c) receiving at said STA, while said STA is performing said ongoing transmissions, a preemption request by another STA; (d) determining from information in the preemption request whether or not to accept the preemption request; and (e) interrupting ongoing transmissions by said preempted STA, in response to accepting the preemption request from the other STA which is operating as a preempting STA, and thus allowing the preempting STA to transmit on the channel.

A wireless communication apparatus performing transmission of packets, where CSMA/CA is applied in the system/apparatus, STA supporting full duplex transmission, comprising: (a) preempted STA detects a preemption request of preempting STA when preempted STA is transmitting; (b) preempted STA interrupts its ongoing transmission if it accepts the preemption request; and (c) preempting STA preempts the transmission of preempted STA after preempted STA interrupts its ongoing transmission.

The apparatus or method of any preceding implementation, wherein the preempted STA has a punctured resource in its PPDU which can be utilized by the preempting STA for detecting third party transmissions.

The apparatus or method of any preceding implementation, wherein the preempted STA only accepts a preemption request from within its own BSS.

The apparatus or method of any preceding implementation, wherein the preempted STA elects to reject the preemption request, and continues its ongoing transmissions.

The apparatus or method of any preceding implementation, wherein the preempted STA elects to interrupt its ongoing transmissions and also its receiving operations at the same time.

The apparatus or method of any preceding implementation, wherein the preempted STA elects to interrupt its ongoing transmissions but wait until after completing the transmission of a current medium access control service data unit (MSDU) or A-MSDU in the PPDU.

The apparatus or method of any preceding implementation, wherein the preempting STA sends a frame to launch its preemption transmission of the preempting STA.

The apparatus or method of any preceding implementation, wherein the preempting STA is only allowed to perform a preemption transmission during a transmit opportunity (TXOP) as obtained by the preempted STA.

The apparatus or method of any preceding implementation, further comprising: (a) wherein said preempting STA has FD capability; and (b) wherein the preempting STA transmits a PPDU to the preempting STA during the time when the preempting STA is transmitting the preemption transmission to the preempted STA.

The apparatus or method of any preceding implementation, wherein the preempted STA disables the preemption transmission during spatial reuse transmission.

The apparatus or method of any preceding implementation, wherein preempted STA disables the preemption transmission during coordinated MAP transmission.

The apparatus or method of any preceding implementation, wherein the preempted STA can have punctured resource in its PPDU so that the preempting STA could use the punctured resource to detect any third party transmissions.

The apparatus or method of any preceding implementation, wherein preempted STA can only accept a preemption request from the same BSS.

The apparatus or method of any preceding implementation, wherein the preempted STA can reject a preemption transmission request.

The apparatus or method of any preceding implementation, wherein the preempted STA can interrupt its ongoing transmission of the transmitting and the receiving at the same time.

The apparatus or method of any preceding implementation, wherein preempted STA could interrupt the ongoing transmission after finishing the current MSDU or A-MSDU in the PPDU.

The apparatus or method of any preceding implementation, wherein preempting STA could send a frame to launch the preemption transmission of the preempting STA.

The apparatus or method of any preceding implementation, wherein preempting STA could only have the preemption transmission during the TXOP obtained by the preempted STA.

The apparatus or method of any preceding implementation, wherein preempting STA could send a PPDU to the preempted STA (i.e., full duplex transmission between the preempting STA and preempted STA) during the time when the preempting STA is transmitting the preemption transmission to the preempted STA.

The apparatus or method of any preceding implementation, wherein the STA can disable the preemption transmission during spatial reuse transmission.

The apparatus or method of any preceding implementation, wherein the STA can disable the preemption transmission during coordinated MAP transmission.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit, as a station (STA), wirelessly communicating over a channel with other STAs on a wireless local area network (WLAN) in an IEEE 802.11 protocol configured for supporting carrier sense multiple access/collision avoidance (CSMA/CA);
   (b) a processor coupled to said STA;
   (c) a non-transitory memory storing instructions executable by the processor for communicating with other STAs and fulfilling different roles of a communications protocol; and
   (d) wherein said instructions, responsive to being executed by the processor, perform steps comprising:
      (i) performing ongoing physical layer protocol data unit (PPDU) transmissions by said STA, which has full duplex (FD) capability and which incorporates a priority indication in its PPDU headers and which embeds punctured resources in each PPDU;
      (ii) accessing the channel of said STA by a preempting STA, seeking to preempt the PPDU from said STA, wherein the channel is accessed by the preempting STA by counting down the backoff responsive to the preempting STA senses the channel is idle during the punctured resource of the PPDU of said STA, and under condition that the PPDU to be sent by said preempting STA has a higher priority than that of the PPDU being sent by said STA; wherein said preempting STA sends a preemption request to said first station;
      (iii) receiving at said STA a preemption request by the preempting STA, and determining from information in the preemption request whether or not to accept the preemption request; and
      (iv) interrupting ongoing transmissions by said STA which is now operating as a preempted STA responsive to said STA accepting the preemption request from the preempting STA, and thus said STA as the preempted STA allows the preempting STA to use the channel.

2. The apparatus of claim 1, wherein the preempted STA has a punctured resource in its PPDU which can be utilized by the preempting STA for detecting third party transmissions.

3. The apparatus of claim 1, wherein the preempted STA only accepts a preemption request from within its own basic service set (BSS).

4. The apparatus of claim 1, wherein the preempted STA elects to reject the preemption request, and continues its ongoing transmissions.

5. The apparatus of claim 1, wherein the preempted STA elects to interrupt its ongoing transmissions and also its receiving operations at the same time.

6. The apparatus of claim 1, wherein the preempted STA elects to interrupt its ongoing transmissions but wait until after completing the transmission of a current medium access control service data unit (MSDU) or A-MSDU in the PPDU.

7. The apparatus of claim 1, wherein the preempting STA sends a frame to launch its preemption transmission of the preempting STA.

8. The apparatus of claim 1, wherein the preempting STA is only allowed to perform a preemption transmission during a transmit opportunity (TXOP) as obtained by the preempted STA.

9. The apparatus of claim 1, further comprising:
   (a) wherein said preempting STA has FD capability; and
   (b) wherein the preempted STA transmits a PPDU to the preempting STA during a time when the preempting STA is transmitting the preemption transmission to the preempted STA.

10. The apparatus of claim 1, wherein the preempted STA disables the preemption transmission during spatial reuse transmission.

11. The apparatus of claim 1, wherein preempted STA disables the preemption transmission during a coordinated MAP transmission.

12. An apparatus for wireless communication in a network, the apparatus comprising:
- (a) a wireless communication circuit, as a station (STA), wirelessly communicating over a channel with other STAs on a wireless local area network (WLAN) in an IEEE 802.11 protocol configured for supporting carrier sense multiple access/collision avoidance (CSMA/CA);
- (b) a processor coupled to said STA;
- (c) a non-transitory memory storing instructions executable by the processor for communicating with other STAs and fulfilling different roles of a communications protocol; and
- (d) wherein said instructions, responsive to being executed by the processor, perform steps comprising:
  - (i) performing ongoing physical layer protocol data unit (PPDU) transmissions by said STA, which has full duplex (FD) capability and which incorporates a priority indication in its PPDU headers and which embeds punctured resources in each PPDU allowing a preempting STA to detect transmissions to other STAs;
  - (ii) accessing the channel of said STA by a preempting STA, seeking to preempt the PPDU from said STA, wherein the channel is accessed by the preempting STA by counting down the backoff responsive to the preempting STA senses the channel is idle during the punctured resource of the PPDU of said STA, and under condition that the PPDU to be sent by the preempting STA has a higher priority than that of the PPDU being sent by said STA; wherein the preempting STA sends a preemption request to said station;
  - (iii) receiving at said STA a preemption request from the preempting STA;
  - (iv) determining from information in the preemption request whether or not to accept the preemption request; and
  - (v) interrupting ongoing transmissions by said STA which is now operating as the preempted STA responsive to said STA accepting the preemption request from the preempting STA, and thus the preempted STA allows the preempting STA to use the channel.

13. The apparatus of claim 12, wherein the preempted STA only accepts a preemption request from within its own basic service set (BSS).

14. The apparatus of claim 12, wherein the preempted STA elects to reject the preemption request, and continues its ongoing transmissions.

15. The apparatus of claim 12, wherein the preempted STA elects to interrupt its ongoing transmissions and also its receiving operations in accepting the preemption request.

16. The apparatus of claim 12, wherein the preempted STA elects to interrupt its ongoing transmissions but wait until after completing the transmission of a current medium access control service data unit (MSDU) or A-MSDU in the PPDU.

17. The apparatus of claim 12, wherein the preempting STA sends a frame to launch its preemption transmission of the preempting STA.

18. The apparatus of claim 12, wherein the preempting STA is only allowed to perform a preemption transmission during a transmit opportunity (TXOP) as obtained by the preempted STA.

19. The apparatus of claim 12, wherein the preempted STA disables the preemption transmission during spatial reuse transmission, or during a coordinated MAP transmission.

20. A method for performing wireless communication in a network, the method comprising:
- (a) wirelessly communicating with other STAs, each having a channel, over which they communicate on a wireless local area network (WLAN) in an IEEE 802.11 protocol configured to allow different STAs to perform different roles during the communications which support carrier sense multiple access/collision avoidance (CSMA/CA);
- (b) performing ongoing physical layer protocol data unit (PPDU) transmissions by a first STA, which has full duplex (FD) capability, having a PPDU header which includes a priority indication, and wherein the PPDU embeds punctured resources;
- (c) accessing the channel of said first STA by a preempting STA, seeking to preempt the PPDU from said first STA, wherein the channel is accessed by the preempting STA by counting down the backoff responsive to the preempting STA senses the channel is idle during the punctured resource of the PPDU of the first STA, and under condition that the PPDU to be sent by said preempting STA has a higher priority than that of the PPDU being sent by said first STA; wherein said preempting STA sends a preemption request to said first station;
- (d) receiving at said first STA, while said first STA is performing said ongoing transmissions, a preemption request by said preempting STA; and determining from information in the preemption request whether or not to accept the preemption request; and
- (e) accepting the preemption request from the preempting STA, and thus allowing the preempting STA to transmit on the channel.

* * * * *